United States Patent [19]
Hamamoto

[11] Patent Number: 5,936,459
[45] Date of Patent: Aug. 10, 1999

[54] INTERNAL POTENTIAL GENERATING CIRCUIT AND BOOSTED POTENTIAL GENERATING UNIT USING PUMPING OPERATION

[75] Inventor: Takeshi Hamamoto, Hyogo, Japan

[73] Assignee: Mitsubishi Denki Kabushiki Kaisha, Tokyo, Japan

[21] Appl. No.: 08/942,485

[22] Filed: Oct. 2, 1997

Related U.S. Application Data

[63] Continuation of application No. 08/688,077, Jul. 29, 1996, abandoned.

[30] Foreign Application Priority Data

Feb. 27, 1996 [JP] Japan .................................... 8-039768

[51] Int. Cl.[6] .................................................. H03K 3/01
[52] U.S. Cl. ........................ 327/536; 327/537; 327/589
[58] Field of Search .................................... 327/534, 535, 327/536, 537, 538, 541, 543, 589, 306, 309, 321; 365/189.09

[56] References Cited

U.S. PATENT DOCUMENTS

| | | | |
|---|---|---|---|
| 4,736,121 | 4/1988 | Cini et al. ................................. | 327/536 |
| 5,003,197 | 3/1991 | Nojima et al. .......................... | 327/536 |
| 5,394,026 | 2/1995 | Yu et al. .................................. | 327/536 |

FOREIGN PATENT DOCUMENTS

55-71058  5/1990  Japan ..................................... 327/534

OTHER PUBLICATIONS

Dong–Jae Lee et al. A 35ns 64Mb DRAM Using On–Chip Boosted Power Supply, 1992 pp. 64–65.
Yasuhiko Tsukikawa et al., An Efficient Back–Bias Generator with Hybrid Pumping Circuit for 1.5–V DRAM'S, 1994 pp. 534–538.
R.C. Ross et al., Application of High–Voltage Pumped Supply for Low–Power DRAM, 1992 pp. 106–107.

*Primary Examiner*—Tuan T. Lam
*Attorney, Agent, or Firm*—McDermott, Will & Emery

[57] ABSTRACT

A first charge pumping circuit including a first capacitor and first and second switches, and a second charge pumping circuit including a second capacitor and third and fourth switches, are operated complementarily. The first capacitor is provided between first and second nodes, and the second capacitor is provided between third and fourth nodes. An NMOS transistor as equalizing means is provided between the first and third nodes. Before the start of supply of charges by the second switch to the second node and injection of charges by the third switch to an output node, the NMOS transistor is turned on, whereby potentials at the first and third nodes are equalized. Accordingly, the charges consumed by the first charge pumping circuit can be recycled by the second charge pumping circuit. Thus, lower power consumption is realized.

22 Claims, 21 Drawing Sheets

FIG.4
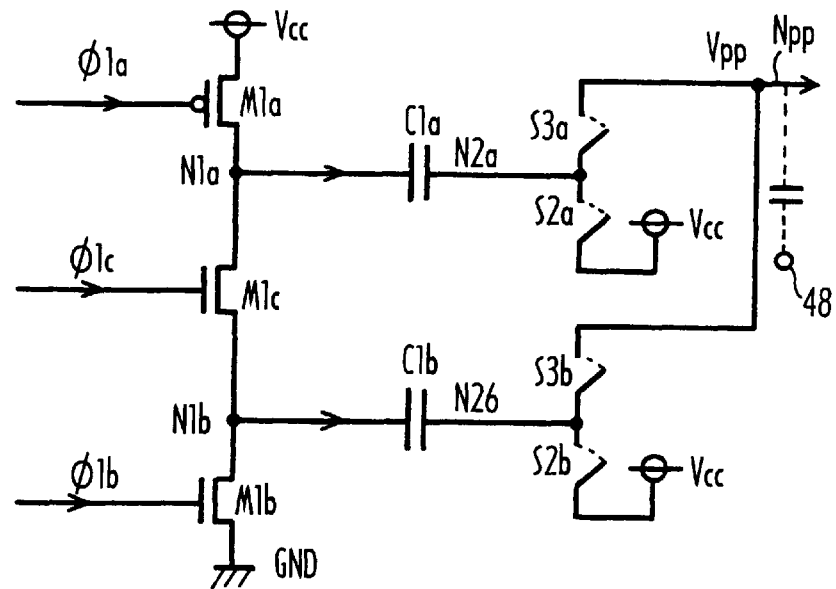
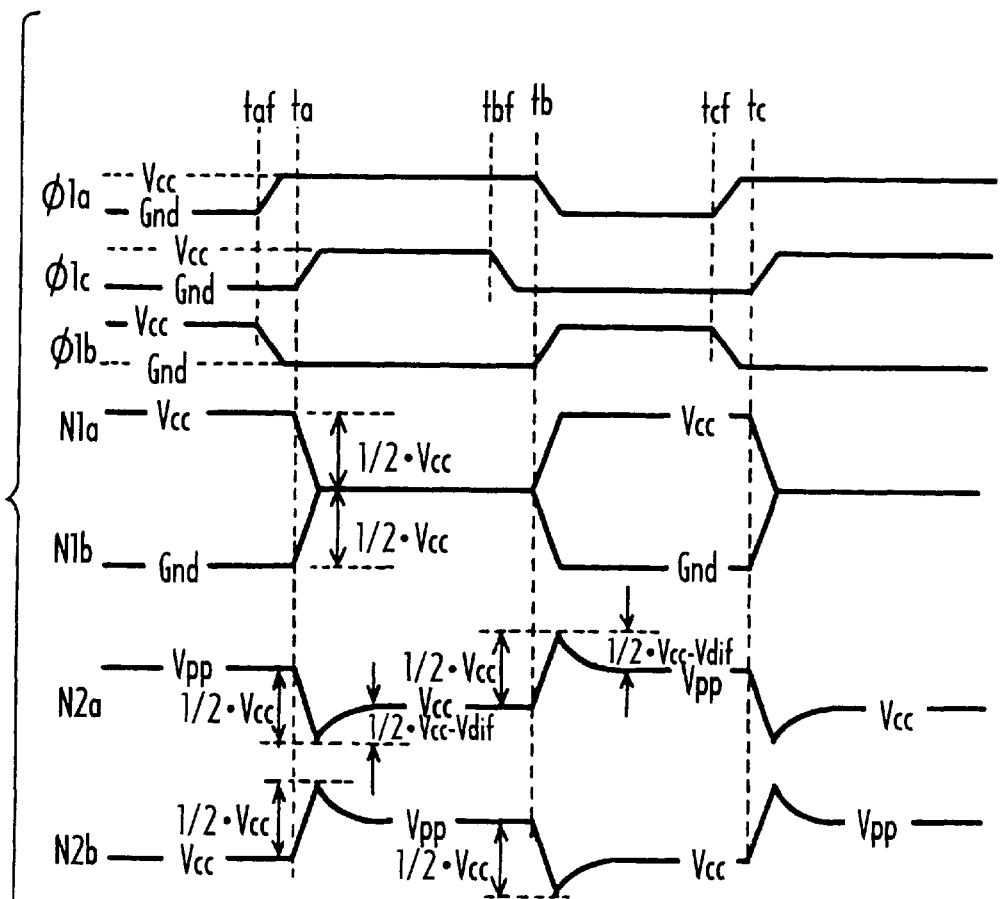
FIG.5

5,936,459

INTERNAL POTENTIAL GENERATING CIRCUIT AND BOOSTED POTENTIAL GENERATING UNIT USING PUMPING OPERATION

This application is a continuation of application Ser. No. 08/688,077 filed Jul. 29, 1996 now abandoned.

BACKGROUND OF THE INVENTION

1. Field of the Invention

The present invention relates to an internal potential generating circuit for generating an internal potential and a boosted potential generating unit contained in a semiconductor device. More specifically, it relates to an internal potential generating circuit and a boosted potential generating unit capable of reducing power consumption.

2. Description of the Background Art

FIG. 29 is a circuit diagram showing details of a boosted potential generating circuit as a conventional internal potential generating circuit.

FIG. 30 is a timing chart showing the operation of the conventional boosted potential generating circuit shown in FIG. 29.

Referring to FIGS. 29 and 30, the operation of the conventional boosted potential generating circuit of FIG. 29 will be described. It is assumed that before time ta, the potential at an input node N1 is at the ground potential GND and the potential at an intermediate node N2 is at the power supply potential Vcc. Switches S2 and S3 are off. At time ta, when a clock φ1b at the GND level is input to the gate of a PMOS transistor M1b, a clock φ1a at the GND level is input to the gate of an NMOS transistor M1a. Therefore, the potential at input node N1 attains to the power supply potential Vcc. The potential at intermediate node N2 attains to 2Vcc because of capacitive coupling by capacitor C1.

Then, when switch S3 turns on, charges corresponding to 2Vcc−Vpp are injected to a boosted potential node Npp. That is, the first charge injection occurs. Here, if an electrode 48 opposing to the boosted potential node Npp is at the ground potential GND, charges corresponding to (2Vcc−Vpp)·C move from the node having the power supply potential Vcc to the electrode (ground potential GND) opposing to the boosted potential node Npp through PMOS transistor M1a, input node N1, capacitor C1, intermediate node N2 and switch S3. In other words, charges corresponding to 2Vcc−Vpp are consumed. This is the first charge consumption. Here, C represents capacitance of capacitor C1.

At time tb, when the clock φ1a at the Vcc level is being input to the gate of NMOS transistor M1a and the clock φ1b at the Vcc level is input to the gate of PMOS transistor M1b, the potential at input node N1 attains to the ground potential GND. The potential at intermediate node N2 lowers from boosted potential Vpp by the power supply potential Vcc, because of capacitive coupling of capacitor C1. More specifically, the potential at intermediate node N2 attains to Vpp−Vcc. Here, switch S3 turns off before time tb.

After time tb, switch S2 is turned on. Therefore, charges corresponding to (2Vcc−Vpp)·C move from the node having the power supply potential Vcc to the node having the ground potential GND through switch S2, intermediate node N2, capacitor C1, input node N1 and NMOS transistor M1b. More specifically, charges corresponding to 2Vcc−Vpp are consumed. This is the second charge consumption.

At time tc, the next cycle starts. In other words, one cycle is completed from time ta to tc. Switch S2 is turned off before time tc.

In summary, charges corresponding to 2C·(2Vcc−Vpp) are consumed in one cycle, and charges corresponding to 2Vcc−Vpp are supplied to the boosted potential node Npp. Therefore, charge efficiency is one half, that is, 50%.

Here, the charge efficiency is 50%. Therefore, when charges I are to be supplied to the boosted potential node Npp in one cycle, charges corresponding to 2I are necessary. Accordingly, in order to supply charges I to the boosted potential node Npp, power consumption of 2I·Vcc is necessary. From the foregoing, it can be understood that power consumption can be reduced if the charge efficiency is improved.

FIG. 31 is a circuit diagram showing details of a substrate potential generating circuit as a conventional internal potential generating circuit.

Referring to FIG. 31, the conventional substrate potential generating circuit includes a PMOS transistor M1a connected between a node having the power supply potential Vcc and an input node N1; an NMOS transistor M1b connected between input node N1 and a node having the ground potential GND; a capacitor C1 connected between input node N1 and an intermediate node N2; a PMOS transistor M3 connected between a substrate potential node Nbb and intermediate node N2; and a PMOS transistor M2 connected between intermediate node N2 and the node having the ground potential GND. PMOS transistors M1a, M2, M3 and NMOS transistor M1b are controlled by clocks φ1a, φ2, φ3 and φ1b, respectively.

FIG. 32 is a timing chart showing the operation of the conventional substrate potential generating circuit shown in FIG. 31.

Clocks φ1a and φ1b have an amplitude of Vcc. Assume that before time taf, input node N1 is at the ground potential GND and intermediate node N2 is at the substrate potential Vbb.

At time taf, clock φ1b is set to the ground potential GND, and NMOS transistor M1b is turned off. At time ta, clock φ1a is set to the ground potential GND and PMOS transistor M1a is turned on. As a result, the potential at input node N1 attains to the power supply potential Vcc. The potential at intermediate node N2 is boosted to Vbb+Vcc by the capacitive coupling of capacitor C1.

At time tad, clock φ2 is set to −Vcc, and PMOS transistor M2 is turned on. Charges at intermediate node N2 is discharged to the node having the ground potential GND. At this time, charges corresponding to (Vcc+Vbb)·C, that is, charges corresponding to (Vcc−|Vbb|) move from the node having the power supply potential Vcc to the node having the ground potential GND, through PMOS transistor M1a, input node N1, capacitor C1, intermediate node N2 and PMOS transistor M2. Namely, charges corresponding to (Vcc+Vbb)·C are consumed. Here, C represents the capacitance of capacitor C1.

At time tbf, clock φ1a is set to the power supply potential Vcc, and PMOS transistor M1a is turned off. At time tb, clock φ1b is set to the power supply potential Vcc and NMOS transistor M1b is turned on. As a result, the potential at input node N1 attains to the ground potential GND. The potential at intermediate node N2 lowers from the ground potential GND to −Vcc by the capacitive coupling of capacitor C1.

At time tbd, clock φ3 is set to −Vcc, and PMOS transistor M3 is turned on. Intermediate node N2 is charged to the substrate potential Vbb. At this time, charges corresponding to (Vcc+Vbb)·C move from the electrode (ground potential GND) opposing to substrate potential node Nbb to the node having the ground potential through substrate potential node Nbb, PMOS transistor M3, intermediate node N2, capacitor C1, input node N1 and MOS transistor M1$b$. Here, charges corresponding to $-(Vcc+Vbb)\cdot C$ are discharged to the substrate potential node Nbb. This is supply of charges to the substrate potential node. However, since this is the movement of charges from a node having the ground potential GND to another node having the ground potential GND, no power is consumed.

At time tcf, the next cycle starts. In other words, operation of one cycle completes from time taf to time tcf.

In summary, the total charges consumed from the node having the power supply potential Vcc to the node having the ground potential GND in one cycle correspond to $(Vcc+Vbb)\cdot C$. The substrate potential Vbb has a negative value. Meanwhile, the charges supplied to substrate potential node Nbb is $-(Vcc+Vbb)\cdot C$. Therefore, charge efficiency is 100%.

Since the charge efficiency is 100%, when charges I are to be injected to the substrate potential node Nbb in one cycle, charges I are consumed. Therefore, when charges I are injected to substrate potential node Nbb in one cycle, the power of $I\cdot Vcc$ is consumed. From the foregoing, it can be understood that power consumption can be lowered by improving charge efficiency.

As described above, in the conventional boosted potential generating circuit, charge efficiency is 50%. The charge efficiency of the conventional substrate potential generating circuit is 100%.

Therefore, in order to realize lower power consumption, it is required to improve the charge efficiency of the boosted potential generating circuit to be higher than 50%, and to improve the charge efficiency of the substrate potential generating circuit to be higher than 100%.

SUMMARY OF THE INVENTION

The present invention was made in view of the foregoing, and its object is to provide an internal potential generating circuit (boosted potential generating circuit, substrate potential generating circuit) which is capable of improving charge efficiency and reducing power consumption.

Another object of the present invention is to provide a boosted potential generating unit which is capable of reducing power consumption.

The internal potential generating circuit in accordance with a first aspect of the present invention is to generate an internal potential at an internal potential node. The internal potential generating circuit includes a first charge pumping circuit and a second charge pumping circuit. The first and second charge pumping circuits generate an internal potential by injecting charges to the internal potential node.

The first charge pumping circuit includes a first input node, a first intermediate node, a first capacitor, a first injecting circuit and a first supplying circuit. A first power supply potential is applied to the first input node. The potential at the first intermediate node changes in response to the change in the potential at the first input node. The first capacitor is connected between the first input node and the first intermediate node. The first injecting circuit injects charges from the first intermediate node to the internal potential node. The first supplying circuit supplies the first power supply potential to the first intermediate node.

The second charge pumping circuit includes a second input node, a second intermediate node, a second capacitor, a second injecting circuit and a second supplying circuit. A second power supply potential is applied to the second input node. The potential at the second intermediate mode changes in response to the change in the potential at the second input node. The second capacitor is connected between the second input node and the second intermediate node. The second injecting circuit injects charges from the second intermediate node to the internal potential node. The second supplying circuit supplies the first power supply potential to the second intermediate node.

The internal potential generating circuit further includes a first equalizing circuit for equalizing the potentials at the first and second input nodes.

The first and second injecting circuits inject charges to the internal potential node alternately. After the injection of charges from the first injecting circuit and supply of the first power supply potential from the second supplying circuit, equalization by the first equalizing circuit starts.

Thereafter, the first power supply potential is supplied by the first supplying circuit and charges are injected by the second injecting circuit. Thereafter, injection of charges by the first injecting circuit and supply of the first power supply potential by the second supplying circuit start.

As described above, in the internal potential generating circuit in accordance with the first aspect of the present invention, before the start of supply of the first power supply potential by the first supplying circuit and injection of charges by the second injecting circuit, the potential at the first input node of the first charge pumping circuit and the potential at the second input node of the second charge pumping circuit are equalized. Accordingly, the first power supply potential supplied by the first supplying circuit to the first intermediate node, that is, charges, can be utilized by the second injecting circuit to inject charges to the internal potential node. More specifically, the charges consumed by the first charge pumping circuit can be used again by the second charge pumping circuit.

Therefore, in the internal potential generating circuit in accordance with the first aspect of the present invention, consumed charges can be reduced, and efficiency in generating the internal potential, that is, charge efficiency can be improved. In other words, lower power consumption is realized.

In the internal potential generating circuit in accordance with the first aspect of the present invention, after the potential at the first input node and the potential at the second input node are equalized, potential change can be applied to the first and second input nodes. Therefore, the maximum value of the possible internal potential can be reduced in absolute value. More specifically, the maximum value of the potential generated in the internal potential generating circuit can be made smaller in absolute value.

Therefore, in the internal potential generating circuit in accordance with the first aspect of the present invention, generation of a potential of unnecessary magnitude therein can be prevented, and hence lower power consumption can be realized.

The internal potential generating unit in accordance with a second aspect of the present invention is to generate a boosted potential at a boosted potential node. The boosted potential generating unit includes a detecting circuit, a boosted potential generating circuit and a connecting and supplying circuit. The detecting circuit detects level of an external power supply potential. The boosted potential generating circuit generates a boosted potential by boosting the external power supply potential. The connecting and supplying circuit is provided between the boosted potential node and a node having the external power supply potential.

When the level of the external power supply potential is higher than the level of the boosted potential to be generated, the external power supply potential is supplied to the boosted potential node as the boosted potential, through the connecting and supplying circuit. In this case, the operation of the boosted potential generating circuit is stopped.

When the level of the external power supply potential is not higher than the level of the boosted potential to be generated, a boosted potential is generated at the boosted potential node, by the boosted potential generating circuit. In this case, the connecting and supplying circuit disconnects the boosted potential node from the node having the external power supply potential.

As described above, in the internal potential generating unit in accordance with the second aspect of the present invention, when the level of the external power supply potential is higher than the level of the boosted potential to be generated, the external power supply potential is directly supplied to the boosted potential node as the boosted potential, through the connecting and supplying circuit.

Therefore, in the internal potential generating unit in accordance with the second aspect of the present invention, when the level of the external power supply potential is higher than the level of the boosted potential to be generated, operation of the boosted potential generating circuit can be stopped, and power consumption can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a circuit diagram showing details of a boosted potential generating circuit as an internal potential generating circuit in accordance with the first embodiment of the present invention.

FIG. 5 is a timing chart showing the operation of the boosted potential generating circuit shown in FIG. 4.

DESCRIPTION OF THE PREFERRED EMBODIMENTS

The internal potential generating circuit (boosted potential generating circuit, substrate potential generating circuit) and the boosted potential generating unit in accordance with the present invention will be described with reference to the figures.

(First Embodiment)

Figure 1:
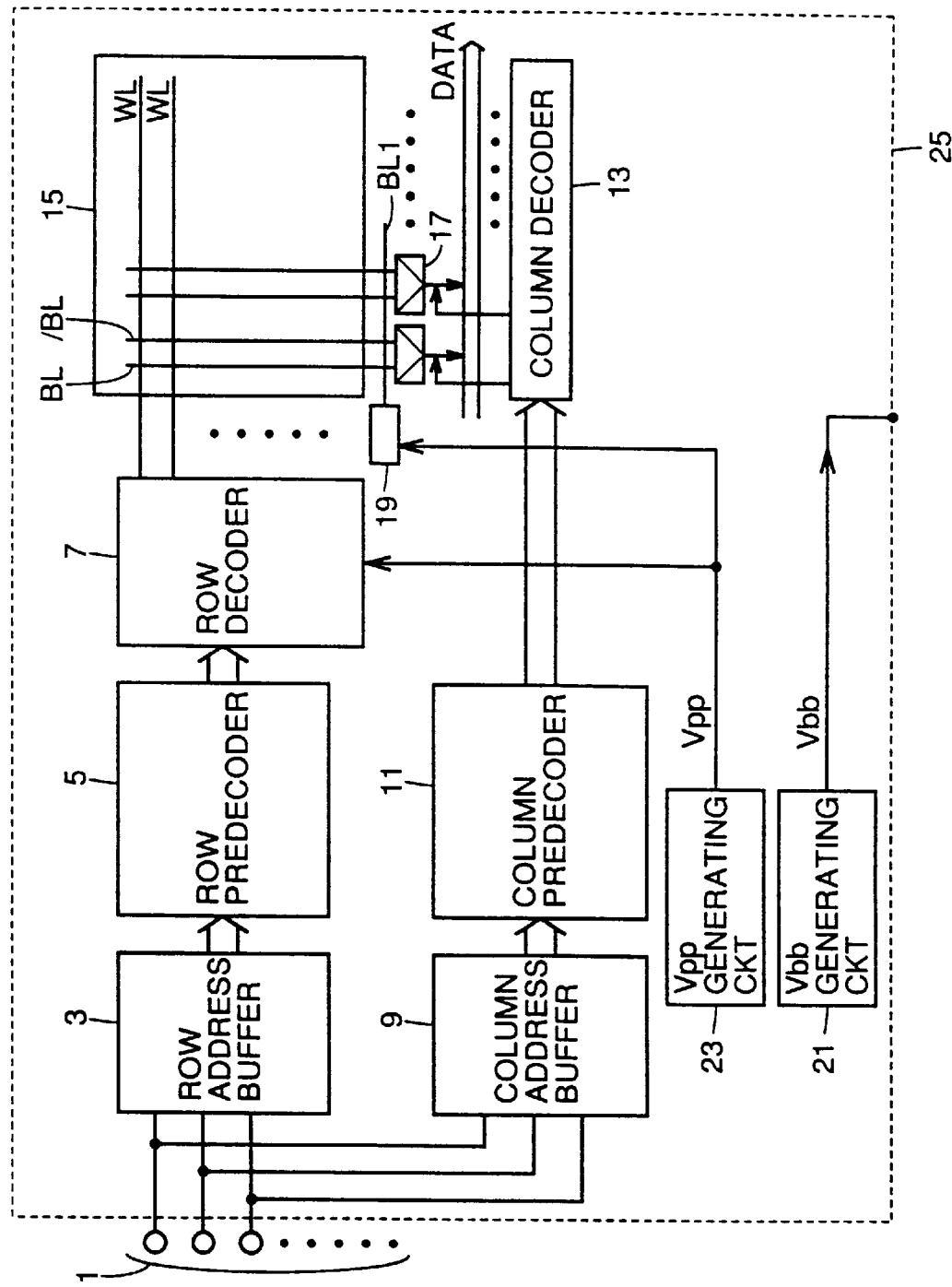
FIG. 1 is a schematic block diagram showing a DRAM containing a boosted potential generating circuit in accordance with a first embodiment of the present invention.

FIG. 1 is a schematic block diagram showing a dynamic random access memory (hereinafter referred to as "DRAM") containing a boosted potential generating circuit (Vpp generating circuit) in accordance with a first embodiment of the present invention.

Referring to FIG. 1, the DRAM includes an address signal input terminal group 1, a row address buffer 3, a row predecoder 5, a row decoder 7, a column address buffer 9, a column predecoder 11, a column decoder 13, a memory cell array 15, a sense amplifier 17, a BLI driver 19, a substrate potential generating circuit (Vbb generating circuit) 21 and a boosted potential generating circuit 23.

Address signal input terminal group 1 receives address signals. Row address buffer 3 applies, of the address signals from address signal input terminal group 1, a row address signal to row predecoder 5. Row predecoder 5 and row decoder 7 select and drive one of a plurality of word lines WL based on the row address signal. Column address buffer 9 applies, of the address signals from address signal input terminal group 1, a column address signal to column predecoder 11. Column predecoder 11 and column decoder 13 select one of a plurality of bit line pairs BL, /BL.

Data is read from a memory cell, not shown, connected to the selected word line WL to the bit line pair BL, /BL. There is generated a potential difference between the paired bit lines, which potential difference is amplified by sense amplifier 17. After amplification by sense amplifier 17, the data of the paired bit lines BL and /BL selected by column decoder 13 is output as read data DATA. BLI driver 19 is a circuit for separating the paired bit lines BL, /BL from sense amplifier 17.

Boosted potential generating circuit 23 generates a boosted potential Vpp as an internal potential, which is higher than the internal power supply potential intVcc generated and used in the chip, or higher than an externally supplied external power supply potential extVcc. The boosted potential Vpp from boosted potential generating circuit 23 is supplied to word line WL through row decoder 7, and to a bit line isolation signal transmitting line BLI through BLI driver 19. Boosted potential generating circuit 23 is the boosted potential generating circuit as the internal potential generating circuit in accordance with the first embodiment.

Substrate potential generating circuit 21 generates substrate potential Vbb as an internal potential which is lower in potential than the ground potential GND of the chip. The substrate potential Vbb from substrate potential generating circuit 21 is supplied to P type semiconductor substrate 25. As will be described in greater detail later, boosted potential generating circuit 23 and substrate potential generating circuit 21 receive an external clock or a reference clock from a ring oscillator and generate the boosted potential Vpp or substrate potential Vbb.

Figure 2:
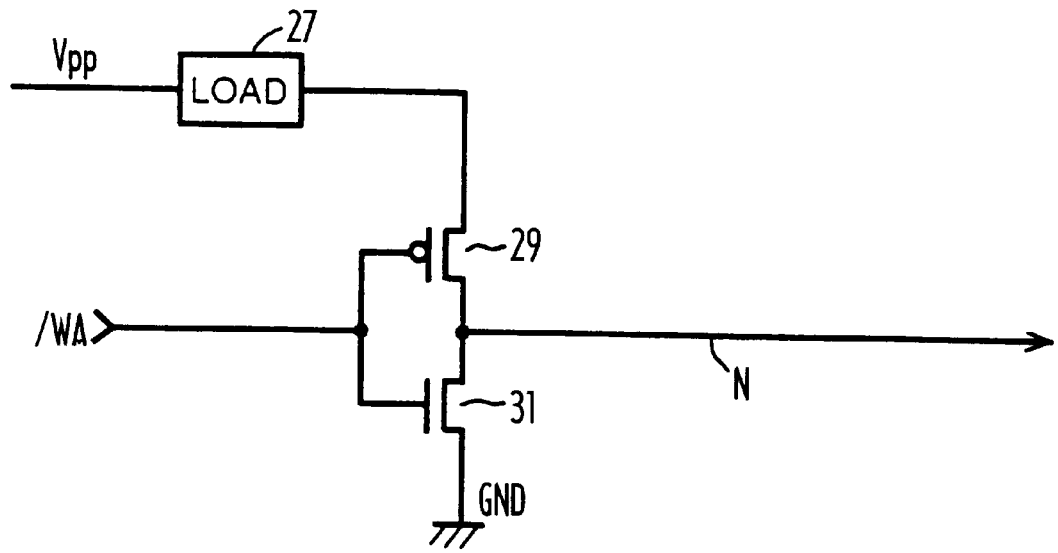
FIG. 2 is a circuit diagram showing details of a row decoder or a BLI driver of FIG. 1.

FIG. 2 is a circuit diagram showing details of row decoder 7 or BLI driver 19 of FIG. 1.

Referring to FIG. 2, the BLI driver includes a load 27, a PMOS transistor 29 and an NMOS transistor 31. PMOS transistor 29 and NMOS transistor 31 are connected in series between load 27 and a node having the ground potential GND. A word line activating signal /WA is input to the gates of PMOS transistor 29 and NMOS transistor 31.

Load 27 is a resistance, a switch or an interconnection. The boosted potential Vpp from boosted potential generating circuit 23 is applied through load 27 to the source of PMOS transistor 29. In other words, the boosted potential Vpp or a potential close to the boosted potential Vpp is applied to the source of PMOS transistor 29.

When the word line activating signal /WA at an "L" level is input, PMOS transistor 29 turns on and NMOS transistor 31 turns off. Accordingly, the boosted potential Vpp or the potential close to the boosted potential Vpp is supplied through PMOS transistor 29 to node N. If the circuit of FIG. 2 is row decoder 7, the node N corresponds to a word line WL. If the circuit of FIG. 2 is BLI driver 19, node N corresponds to bit line isolation signal transmitting line BLI.

Figure 3:
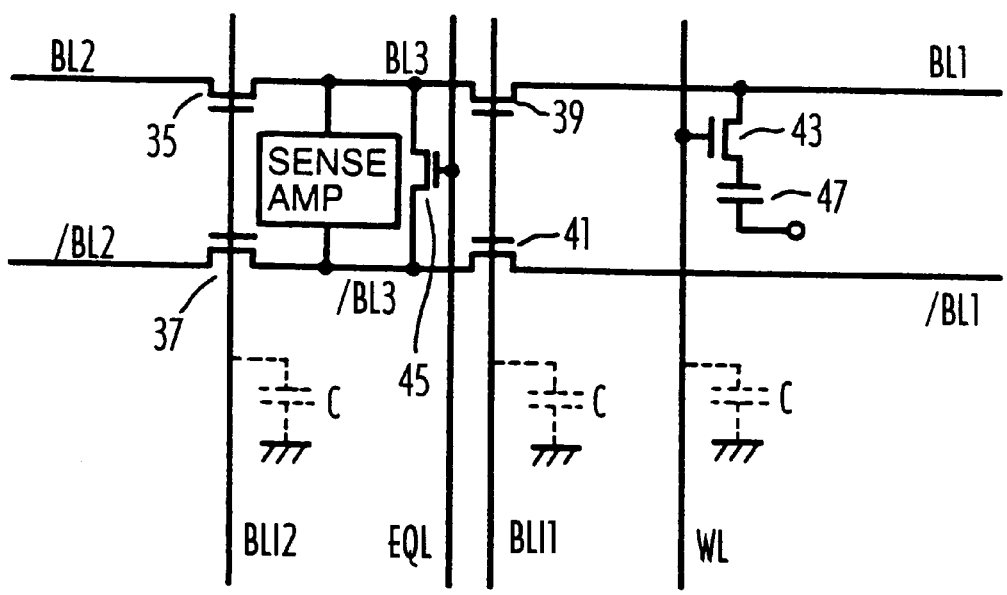
FIG. 3 is a circuit diagram showing details of a portion to which a boosted potential Vpp is supplied, in a general DRAM.

FIG. 3 is a circuit diagram showing details of a portion to which the boosted potential Vpp is supplied in a general DRAM.

Referring to FIG. 3, bit lines BL2 and BL3 are connected through an NMOS transistor 35. Bit lines /BL2 and /BL3 are connected through an NMOS transistor 37. NMOS transistors 35 and 37 have their gates connected to a bit line isolation signal transmitting line BLI2. Bit line isolation signal transmitting line BLI2 has a parasitic capacitance C.

Bit lines BL3 and BL1 are connected through NMOS transistor 39. Bit lines /BL3 and /BL1 are connected through an NMOS transistor 41. NMOS transistors 39 and 41 have their gates connected to a bit line isolation signal transmitting line BLI1. Bit line isolation signal transmitting line BLI1 has a parasitic capacitance C.

At a crossing between a word line WL and bit line BL1, a memory cell including an NMOS transistor 43 and a capacitor 47 is connected. One side of capacitor 47 is at a fixed potential. Word line WL has a parasitic capacitance C. Between bit lines BL3 and /BL3, an NMOS transistor 45 is provided. NMOS transistor 45 has its gate connected to bit line equalizing signal transmitting line EQL.

Bit line isolation signal transmitting line BLI1 is for transmitting a bit line isolation signal for isolating bit line pair BL1, /BL1 from sense amplifier 33, that is, for isolating bit line pair BLI, /BLI from bit line pair BL3, /BL3. This also applies to bit line isolation signal transmitting line BLI2.

Bit line equalizing signal transmitting line EQL is for transmitting a bit line equalizing signal for controlling equalization of the potential at bit line BL3 and the potential at bit line /BL3. The boosted potential Vbb generated from boosted potential generating circuit 23 is supplied to such bit line isolation signal transmitting lines BLI1 and BLI2, the word line WL and the bit line equalizing signal transmitting line EQL. Therefore, the boosted potential Vpp must be higher than the upper limit of the potential (amplitude) of the bit line (BL1, /BL1, BL2, /BL2, BL3, /BL3) by at least the threshold voltage Vth of transistors 35 to 43. The upper limit of the potential of the bit lines is generally equal to the power supply voltage Vcc of the memory cell array. Therefore, the boosted potential Vpp must satisfy the following relation.

$$Vpp \geq Vcc + Vth \tag{1}$$

Here, the boosted potential generating circuit in accordance with the first embodiment is provided to reduce power consumption. In the following, how the power consumption is reduced by the boosted potential generating circuit in accordance with the first embodiment will be described, based on a general boosted potential generated circuit.

In a general boosted potential generating circuit used in a DRAM, the boosted potential Vpp must satisfy the following condition, because of circuit restrictions.

$$Vpp < 2 \cdot Vcc \qquad (2)$$

Therefore, the boosted potential Vpp generated from a general boosted potential generating circuit is set to such a range that satisfies the expression (2). Accordingly, the threshold voltage Vth naturally satisfies the following condition.

$$Vcc > Vth \qquad (3)$$

Recently, the externally applied external power supply potential extVcc. is often down converted to be used as the potential for the internal operational power supply. Therefore, especially the potential of the operational power supply in the memory cell array portion, that is, the internal power supply potential intVcc is generally considerably lower than the external power supply potential extVcc. Here, the potential difference between external power supply potential extVcc and the internal power supply potential intVcc is represented by Veid. In this case, it is not necessary to use a boosted potential generating circuit if the following relation is satisfied.

$$Veid \geq Vth \qquad (4)$$

In equation (1), if it is assumed that the power supply potential Vcc is the internal power supply potential intVcc and in equation (2) that the power supply potential Vcc is the internal power supply potential intVcc, the following relation derives from equations (1) and (2).

$$Vth < intVcc + 2Veid \qquad (5)$$

Recently, as the capacity becomes larger and the voltage used becomes lower in a DRAM, the power consumed by the boosted potential generating circuit incorporated in the DRAM occupied considerable and increasing ratio of the power consumed by the whole chip. Therefore, reduction in power consumption of the boosted potential generating circuit in the DRAM is strongly desired. In actual use of the DRAM, the condition (4) is not satisfied. However, the condition (5) is satisfied. Here, the condition (5) is satisfied not barely but with a margin. Here, let us assume a potential Vm intermediate between Veid and intVcc+2Veid. From the fact that condition (4) is not satisfied, and from condition (5), the following relation derives.

$$Vied < Vth < Vm < intVcc + 2Veid \qquad (6)$$

Accordingly, the threshold voltage Vth have to be within the following range.

$$Vied < Vth < Vm \qquad (7)$$

More specifically, considering the relation (1), the boosted potential Vpp should be at least intVcc+Vm, and it need not be intVcc+(intVcc+2Veid) or higher. In other words, it is not necessary for the boosted potential generating circuit to generate a potential which is higher than intVcc+(intVcc+2Veid), and it is sufficient to generate a potential intVcc+Vm, which is smaller.

Figure 28:
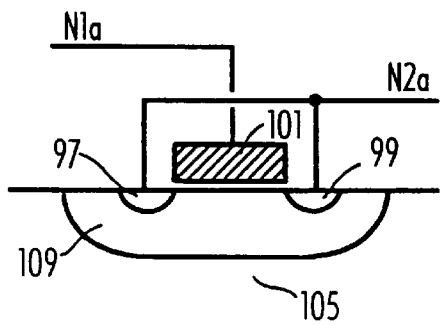
FIG. 28 is a cross sectional view showing another capacitor used for an internal potential generating circuit in accordance with the thirteenth embodiment of the present invention.

For example, in the conventional boosted potential generating circuit shown in FIG. 28, the potential of 2Vcc is generated therein, in order to generate the boosted potential Vpp, and it can generate the boosted potential Vpp which is equal to 2Vcc at the highest. Therefore, if the potential of the boosted potential Vpp which can be generated is made smaller than 2Vcc, a boosted potential generating circuit having smaller power consumption than the conventional one shown in FIG. 28 can be implemented. The boosted potential generating circuit in accordance with the first embodiment which is made in view of the foregoing and in view of improved charge efficiency will be described in greater detail.

FIG. 4 is a circuit diagram showing the boosted potential generating circuit as the internal potential generating circuit in accordance with the first embodiment of the present invention.

Referring to FIG. 4, the boosted potential generating circuit in accordance with the first embodiment includes a PMOS transistor M1a, NMOS transistors M1c, M1b, capacitors C1a, C1b and switches S3a, S2a, S3b and S2b.

PMOS transistor M1a and NMOS transistors M1c and M1b are connected in series between a node having the power supply potential Vcc and the node having the ground potential GND. PMOS transistor M1a receives at its gate a clock φ1a. NMOS transistor M1c receives at its gate a clock φ1c. NMOS transistor M1b receives at its gate a clock φ1b. Capacitor C1a is connected between an input node N1a and an intermediate node N2a. Capacitor C1b is connected between an input node N1b and an intermediate node N2b. Switch S3a is provided between a boosted potential node Npp and intermediate node N2a. Switch S2a is provided between intermediate node N2a and the node having the power supply potential Vcc. Switch S3b is provided between the boosted potential node Npp and intermediate node N2b. Switch S2b is provided between intermediate node N2b and the node having the power supply potential Vcc. The substrate potential generating circuit is for generating the boosted potential Vpp at the boosted potential node Npp.

FIG. 5 is a timing chart showing the operation of the substrate potential generating circuit of FIG. 4. In the following description, it is assumed that Vpp−Vcc=Vdif, and efficiencies in capacitors C1a and C1b are 100%. Further, it is assumed that capacitors C1a and C1b have the capacitance C.

Clocks φ1a and φ1b are complementary clocks having the amplitude of Vcc. Clock φ1c has the same frequency as clocks φ1a and φ1b, and the amplitude of Vcc.

Assume that before time taf, input node N1a is at the power supply potential Vcc, input node N1b is at the ground potential GND, intermediate node N2a is at the boosted potential Vpp and intermediate node N2b is at the power supply potential Vcc.

At time taf, clock φ1a is made higher to the power supply potential Vcc and clock φ1a is made lower to the ground potential GND. By doing so, the input node N1a is separated from the node having the power supply potential Vcc, and input node N1b is separated from the node having the ground potential GND. At time ta, clock φ1c rises to the power supply potential Vcc, and as a result, NMOS transistor M1c turns on. Consequently, the potential at node N1a and the potential at node N1b are equalized, and hence the potential at each of the nodes will be (½) Vcc. Further, at time ta, the potential at input node N1a lowers to (½) Vcc.

Therefore, because of capacitive coupling by capacitor C1a, the potential at intermediate node N2a reaches (½) Vcc+Vdif. At time ta, the potential at input node N1b increases to (½) Vcc. Therefore, because of capacitive coupling by capacitor C1b, the potential at intermediate node N2b attains (³⁄₂) Vcc.

Immediately after time ta, intermediate node N2a is charged to the power supply potential Vcc by switch S2a. At the same time, intermediate node N2b is discharged to the boosted potential Vpp by switch S3b. More specifically, charges corresponding to {(½)(Vcc−Vdif)·C are supplied to boosted potential node Npp through switch S3b. This is the first charge supply.

In this case, if the electrode 48 opposing to boosted potential node Npp is at the ground potential GND, charges corresponding to {(½) Vcc−Vdif}·C move from the node having the power supply potential Vcc to the electrode (having the ground potential GND) opposing to the boosted potential node Npp, through switch S2a, intermediate node N2a, capacitor C1a, input node N1a, NMOS transistor M1c, input node N1b, capacitor C1b, intermediate node N2b and switch S3b. Namely, this is the first charge consumption.

At time tbf, NMOS transistor M1c turns off, and thereafter at time tb, clock φ1a lowers to the ground potential GND. Therefore, input node N1a is charged to have the potential of the power supply potential Vcc. Meanwhile, at time tb, clock φ1b increases to the power supply potential Vcc and therefore input node N1b is discharged to have the ground potential GND. From the foregoing, at time tb, intermediate node N2a is subjected to capacitive coupling to have the potential of (³⁄₂) Vcc, while intermediate node N2b is subjected to capacitive coupling to have the potential of (½) Vcc−Vdif.

Immediately after time tb, intermediate node N2a is discharged to the boosted potential Vpp by switch S3a. More specifically, charges {(½) Vcc−Vdif}·C are supplied to boosted potential node Npp through switch S3a. This is the second charge supply. At the same time, node N2b is charged to the power supply potential Vcc by switch S2b.

In this case, if the electrode opposing to the boosted potential node Npp is at the ground potential GND, charges corresponding to {½) Vcc−Vdif}·C move from the node having the power supply potential Vcc to the electrode (having the ground potential GND) opposing to the boosted potential node Npp through PMOS transistor M1a, input node N1a, capacitor C1a, intermediate node N2a and switch S3a. This is the second charge consumption. At the same time, charges corresponding to {(½) Vcc−Vdif}·C move from the node having the power supply potential Vcc to the node having the ground potential GND through switch S2b, intermediate node N2b, capacitor C1b, input node N1b and NMOS transistor M1b. This is the third charge consumption. The second and third charge consumptions occur simultaneously.

At time tcf, clock φ1a increases to the power supply potential Vcc, clock φ1b lowers to the ground potential GND, and the operation of the next cycle starts. Therefore, from time taf to time tcf, operation of one cycle is completed.

From the foregoing, the total charges consumed from the node having the power supply potential Vcc to the node having the ground potential GND in one cycle would be {(³⁄₂) Vcc−3Vdif}·C. Meanwhile, charges supplied to the boosted potential node Npp in one cycle correspond to {Vcc−2Vdif}·C. Therefore, charge efficiency in one cycle is ²⁄₃. Namely, the charge efficiency of the boosted potential generating circuit in accordance with the first embodiment exceeds the charge efficiency of the conventional boosted potential generating circuit shown in FIG. 29, which was 50%.

Here, when the charges supplied to the boosted potential node Npp in one cycle in the boosted potential generating circuit in accordance with the first embodiment is represented by I, charges corresponding to (³⁄₂) I are consumed in order to supply the charges. Therefore, power consumption in one cycle is (³⁄₂) I·Vcc. This is smaller than 2I·Vcc consumed when charges I are supplied to boosted potential node Npp by the conventional boosted potential generating circuit shown in FIG. 29 in one cycle.

Figure 29:
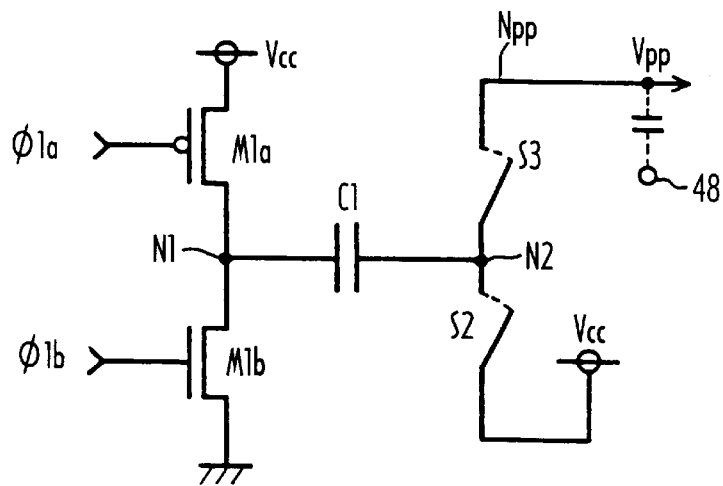
FIG. 29 is a circuit diagram showing details of a boosted potential generating circuit as a conventional internal potential generating circuit.
Figure 30:
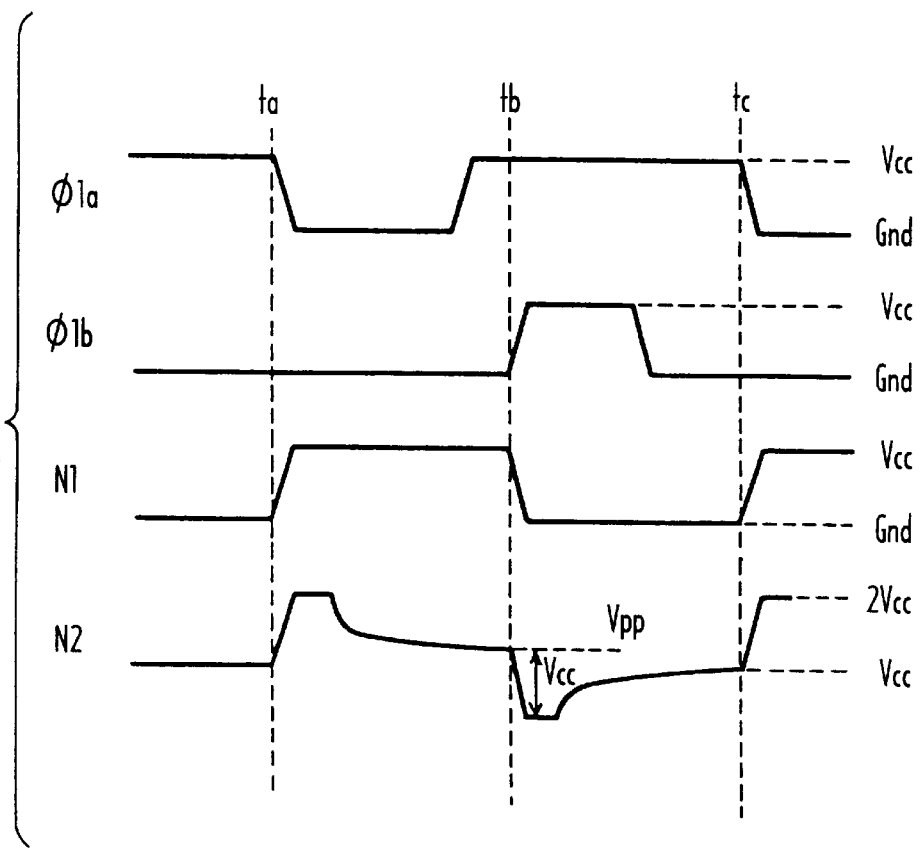
FIG. 30 is a timing chart showing the operation of the boosted potential generating circuit shown in FIG. 29.

In the conventional boosted potential generating circuit shown in FIG. 29, it is necessary to generate a potential up to 2Vcc in order to generate the boosted potential Vpp, and the possible highest boosted potential is 2Vcc. By contrast, in the boosted potential generating circuit in accordance with the first embodiment, (³⁄₂) Vcc is generated at most in order to generate the boosted potential Vpp, and possible highest boosted potential is (³⁄₂) Vcc. Namely, the boosted potential which can be generated by the boosted potential generating circuit in accordance with the first embodiment is smaller than the boosted potential which can be generated by the conventional boosted potential generating circuit. Therefore, the power consumption of the boosted potential generating circuit in accordance with the first embodiment is smaller than that of the conventional boosted potential generating circuit shown in FIG. 29.

Next, assume that the opposing electrode 48 is at the power supply potential Vcc. When charges are supplied to boosted potential node Npp, current flows to the electrode (having the power supply potential Vcc) opposing to the boosted potential node Npp. Therefore, there is not the first or second charge consumption as described above. In view of the foregoing, charge efficiency is calculated. The total charges consumed in one operation cycle from the node having the power supply potential Vcc to the node having the ground potential GND correspond to {(½) Vcc−Vdif}·C. Meanwhile, charges supplied to boosted potential node Npp in one cycle correspond to {Vcc−2Vdif}·C. Therefore, charge efficiency is 2. Namely, charge efficiency reaches as high as 200%, and lower power consumption can be realized.

The principle of the fact that the boosted potential generating circuit in accordance with the first embodiment is capable of reducing power consumption will be described. In the conventional boosted potential generating circuit shown in FIG. 29, charges are consumed twice in one cycle, and charges are supplied once to the boosted potential node Npp. By contrast, in the boosted potential generating circuit in accordance with the first embodiment, charge are consumed three times and charges are supplied twice to the boosted potential node Npp, in one cycle. Therefore, in the sense that the boosted potential generating circuit in accordance with the first embodiment supplies charges twice to the boosted potential node Npp, the operation is comparable to an example which includes two conventional boosted potential generating circuits shown in FIG. 29 in parallel. When two conventional substrate potential generating circuits shown in FIG. 29 are provided, charges are consumed four times and charges are supplied twice to the boosted potential node Npp in one cycle. Accordingly, in the boosted potential generating circuit in accordance with the first embodiment, as compared with the example including two conventional boosted potential generating circuits, the number of charge consumption is smaller by one. This is why the boosted potential generating circuit in accordance with the first embodiment realizes lower power consumption. The details are as follows.

Referring to FIGS. 4 and 5, after NMOS transistor M1c turns on at time ta, in other words, after equalization of the potentials at its nodes N1a and N1b is started by NMOS transistor M1c serving as equalizing means, the power supply potential Vcc, that is, charges are supplied to intermediate node N2a by switch S2a. Meanwhile, simultaneously with the turning on of switch S2a, switch S3b turns on, and charges at intermediate node N2b are supplied to boosted potential node Npp. At this time, if the opposing electrode 48 opposing to boosted potential node Npp is at the ground potential GND, charges are consumed. As the charges moving to opposing electrode 48 through switch S3b, charges supplied from the node having the power supply potential Vcc to intermediate node N2a through switch S2a can be utilized. This is because equalization is performed by NMOS transistor M1c.

More specifically, charges supplied to a first charge pumping circuit constituted by capacitor C1a and switches S3a, S2a (that is, charges consumed in the first charge pumping circuit) are recycled by a second charge pumping circuit constituted by capacitor C1b and switches S3b and S2b. Therefore, as compared with the example including two conventional boosted potential generating circuits, number of charge consumption can be reduced by one. In this manner, the boosted potential generating circuit in accordance with the first embodiment lowers power consumption.

Figure 6:
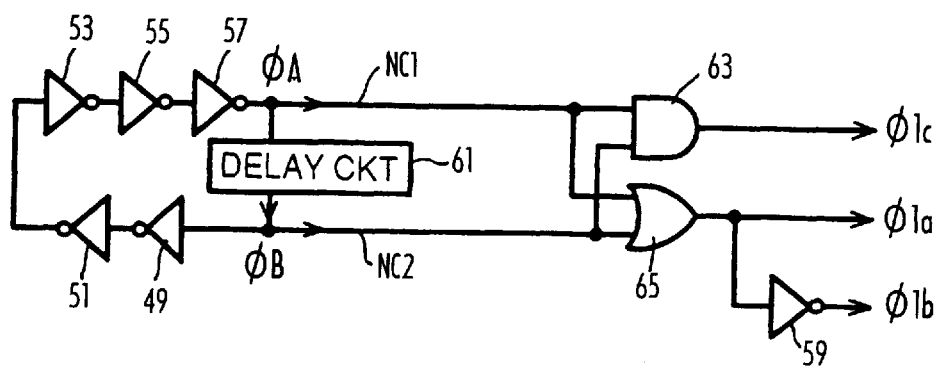
FIG. 6 is a circuit diagram showing details of a clock generating circuit for generating clocks φ1a, φ1c, φ1b of FIG. 4.

FIG. 6 is a circuit diagram showing details of the clock generating circuit for generating clocks $\phi 1a$, $\phi 1c$ and $\phi 1b$ of FIG. 4.

Referring to FIG. 6, the clock generating circuit includes inverters 49, 51, 53, 55, 57 and 59, a delay circuit 61, an NAND circuit 63 and an OR circuit 65.

Inverters 49 to 57 are connected in series between nodes NC1 and NC2. Delay circuit 61 is provided between nodes NC1 and NC2. AND circuit 63 and OR circuit 65 each have one input node connected to node NC1. NAND circuit 63 and OR circuit 65 each have the other input node connected to node NC2. OR circuit 65 has its output node connected to the input node of inverter 59.

Referring to FIG. 6, by the ring oscillator provided by inverters 49 to 57, clock $\phi A$ is generated at node NC1. Delay circuit 61 outputs a clock $\phi B$ by delaying clock $\phi A$ at node NC2. By providing an AND of clocks $\phi A$ and $\phi B$ by AND circuit 63, clock $\phi 1c$ is generated. By providing an OR of clocks $\phi A$ and $\phi B$ by OR circuit 65, clock $\phi 1a$ is generated. By having the phase of clock $\phi 1a$ from OR circuit 65 inverted by inverter 59, clock $\phi 1b$ is generated.

Figure 7:
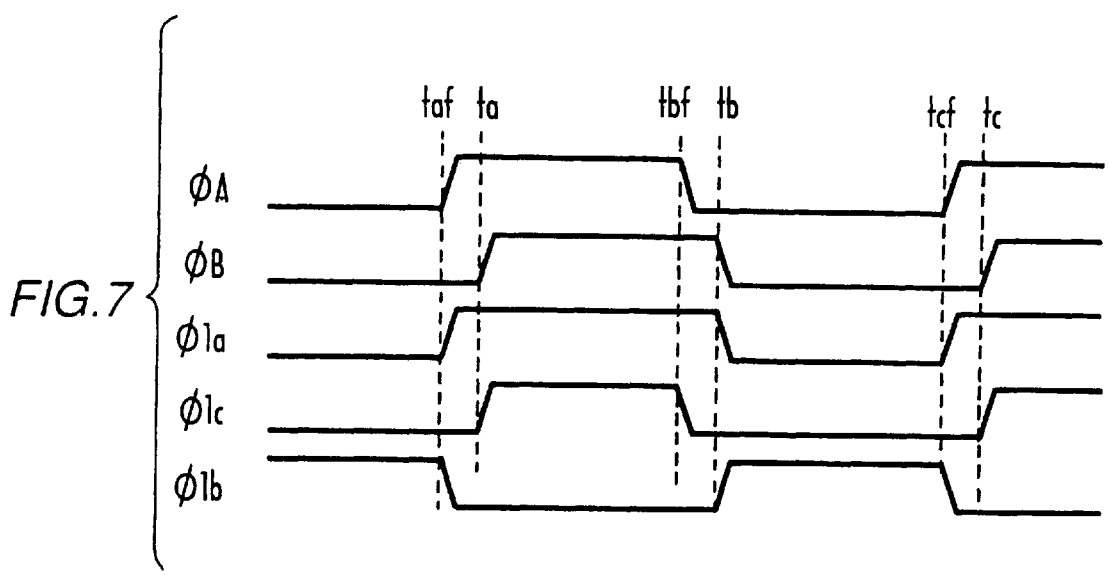
FIG. 7 is a timing chart showing the operation of the clock generating circuit shown in FIG. 6.

FIG. 7 is a timing chart of clocks $\phi A$, $\phi B$, $\phi 1a$, $\phi 1b$ and $\phi 1c$ generated by the clock generating circuit shown in FIG. 6.

Referring to FIG. 7, at time taf, clock $\phi A$ attains to the "H" level. After a delay provided by delay circuit 61, that is, at time ta, clock $\phi B$ attains to the "H" level.

At the time tbf, clock $\phi A$ attains to the "L" level. After a delay provided by delay circuit 61, that is, at time tb, clock $\phi B$ attains to the "L" level.

In accordance with the levels of clocks $\phi A$ and $\phi B$ described above, levels of clocks $\phi 1a$, $\phi 1b$ and $\phi 1c$ are determined.

As described above, in the boosted potential generating circuit as the internal voltage generating circuit in accordance with the first embodiment, the first charge pumping circuit constituted by capacitor C1a and switches S3a and S2a is operated complementarily to the second charge pumping circuit constituted by capacitor C1b and switches S3b and S2b. Further, after the start of equalization by NMOS transistor M1c as equalizing means, that is, after time ta, power supply potential Vcc, that is, charges are supplied to intermediate node N2a through switch S2a of the first charge pumping circuit. At the same time, the charges at intermediate node N2b are injected to the boosted potential node Npp through switch S3b of the second charge pumping circuit.

Therefore, in the boosted potential generating circuit in accordance with the first embodiment, charges supplied to the first charge pumping circuit (charges consumed by the first charge pumping circuit) can be supplied to intermediate node N2b through NMOS transistor M1c. Therefore, charges supplied to the first charge pumping circuit (charges consumed in the first charge pumping circuit) can be used again as the charges to be injected to the boosted potential node Npp from the switch S3b of the second charge pumping circuit.

As a result, in the boosted potential generating circuit in accordance with the first embodiment, charge efficiency (charges injected to boosted potential node Npp/charges consumed) can be improved and power consumption can be reduced.

In the boosted potential generating circuit in accordance with the first embodiment, after the potentials at input nodes N1a and N1b are equalized, the potentials at input nodes N1a and N1b are changed at time tb. Therefore, the change in potentials of input nodes N1a and N1b at time tb are ($\frac{1}{2}$)·Vcc. Therefore, the change in potentials of intermediate nodes N2a and N2b at time tb is also ($\frac{1}{2}$)·Vcc. Therefore, the maximum value of the potential generated internally in order to generate the boosted potential Vpp, that is, the maximum value of possible boosted potential Vpp can be reduced. In the conventional boosted potential generating circuit, the change in potential at the intermediate node N2 is Vcc and the maximum value of possible boosted potential is 2Vcc, while the maximum value of the boosted potential which can be generated by the boosted potential generating circuit in accordance with the present embodiment is $\frac{3}{2}$Vcc.

In this manner, in the boosted potential generating circuit in accordance with the first embodiment, generation of a potential having unnecessary magnitude therein can be prevented, and hence lower power consumption is realized. The power supply potential Vcc of the boosted potential generating circuit shown in FIG. 4 may be the external power supply potential extVcc, or it may be an internal power supply potential intVcc.

(Second Embodiment)

In the boosted potential generating circuit as the internal potential generating circuit in accordance with the second embodiment, switches S2a, S2b, S3a and S3b of the boosted potential generating circuit (first embodiment) shown in FIG. 4 are replaced by specific electric circuits. Therefore, the operation of the boosted potential generating circuit in accordance with the second embodiment is similar to that of the boosted potential generating circuit in accordance with the first embodiment. Therefore, the boosted potential generating circuit in accordance with the second embodiment provides similar effects as the boosted potential generating circuit in accordance with the first embodiment.

Figure 8:
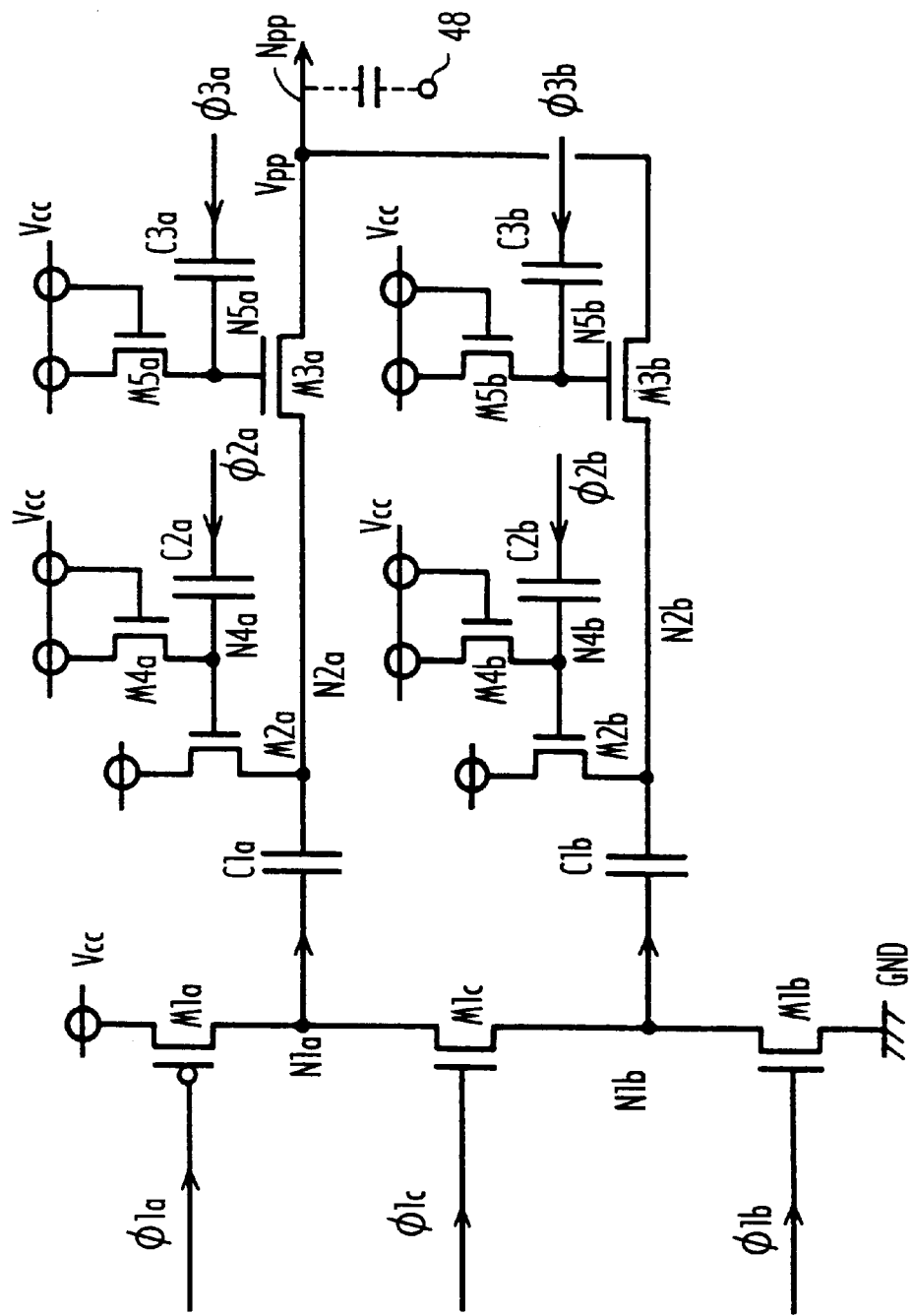
FIG. 8 is a circuit diagram showing details of a boosted potential generating circuit as an internal potential generating circuit in accordance with a second embodiment of the present invention.

FIG. 8 is a circuit diagram showing details of the boosted potential generating circuit as the internal potential generating circuit in accordance with the second embodiment. Portions similar to those of FIG. 4 are denoted by the same reference characters, and description thereof is not repeated.

Referring to FIG. 8, an electric circuit including NMOS transistors M2a and M4a and a capacitor C2a corresponds to switch S2a of FIG. 4. NMOS transistor M2a is connected between a node having power supply potential Vcc and an intermediate node N2a. NMOS transistor M2a has its gate connected to a node N4a. NMOS transistor M4a is connected between the node having the power supply potential Vcc and node N4a. NMOS transistor M4a has its gate connected to the node having the power supply potential Vcc. Capacitor C2a is connected to node N4a and receives a clock φ2a.

An electric circuit including NMOS transistors M3a and M5a and a capacitor C3a corresponds to switch S3a of FIG. 4. NMOS transistor M3a is connected between intermediate node N2a and boosted potential node Npp. NMOS transistor M3a has its gate connected to node N5a. NMOS transistor M5a is connected between a node having power supply potential Vcc and a node N5a. NMOS transistor M5a has its gate connected to the node having power supply potential Vcc. Capacitor C3a is connected to node N5a and receives a clock φ3a.

An electric circuit including NMOS transistors M2b and M4b and a capacitor C2b corresponds to switch S2b of FIG. 4. NMOS transistor M2b is connected between the node having power supply potential Vcc and intermediate node N2b. NMOS transistor M2b has its gate connected to node N4b. NMOS transistor M4b is connected between the node having power supply potential Vcc and node N4b. NMOS transistor M4b has its gate connected to the node having power supply potential Vcc. Capacitor C2b is connected to node N4b and receives clock φ2b.

An electric circuit including NMOS transistors M3b and M5b and a capacitor C3b corresponds to switch S3b of FIG. 4. NMOS transistor M3b is connected between intermediate node N2b and boosted potential node Npp. NMOS transistor M3b has its gate connected to node N5b. NMOS transistor M5b is connected between a node having the power supply potential Vcc and node N5b. NMOS transistor M5b has its gate connected to the node having power supply potential Vcc. Capacitor C3b is connected to node N5b and receives a clock φ3b.

Figure 9:
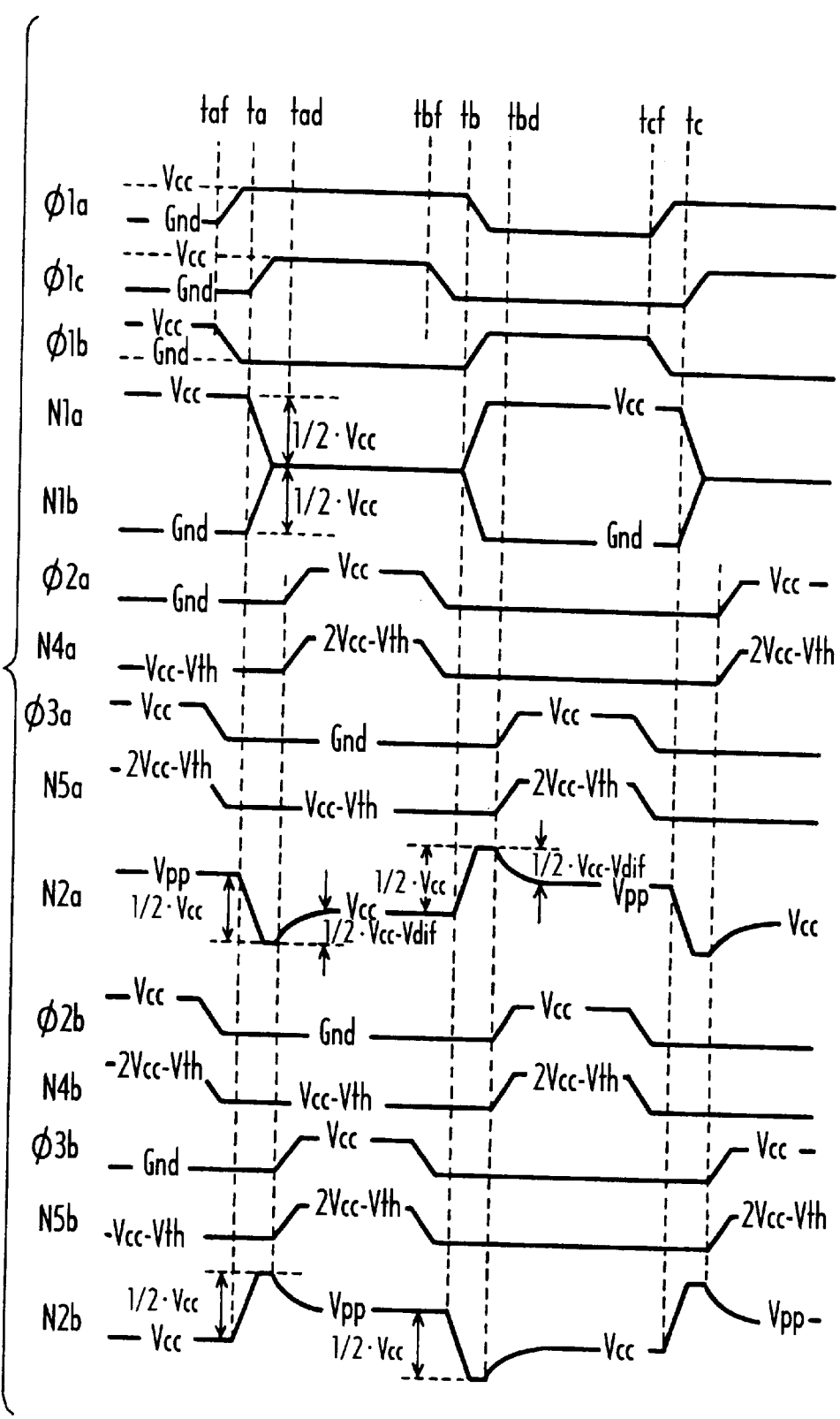
FIG. 9 is a timing chart showing the operation of the boosted potential generating circuit shown in FIG. 8.

FIG. 9 is a timing chart showing the operation of the boosted potential generating circuit of FIG. 8. It is assumed that Vpp−Vcc=Vdif.

Referring to FIG. 9, the operation at from taf to ta is the same as in the boosted potential generating circuit in accordance with the first embodiment. More specifically, at time ta, clock φ1c is increased to the power supply potential Vcc, NMOS transistor M1a is turned on, and the potentials at input nodes N1a and N1b are equalized. As a result, potentials at input nodes N1a and N1b attain to (½) Vcc.

At time tad, clocks φ2a and φ3b are raised to the power supply potential Vcc, whereby nodes N4a and N5b are boosted to 2Vcc−Vth, by capacitive coupling. Consequently, NMOS transistors M2a and M3b are turned on. At this time, intermediate node N2a is charged to the power supply potential Vcc by NMOS transistor M2a, and intermediate node N2b is discharged to the boosted potential Vpp by NMOS transistor M3b.

In this case, charges corresponding to {(½) Vcc−Vdif}·C are supplied to boosted potential node Npp through NMOS transistor M3b. Namely, this is the first charge supply to the boosted potential node Npp. Here, if the electrode 48 opposing to boosted potential node Npp is at the ground potential GND, charges corresponding to {(½) Vcc−Vdif}·C move from the node having the power supply potential Vcc to the electrode 48 (having the ground potential GND) opposing to the boosted potential node Npp through NMOS transistor N2a, intermediate node N2a, capacitor C1a, input node N1a, NMOS transistor M1c, input node N1b, capacitor C1b, intermediate node N2b and NMOS transistor M3b. Namely, this is the first charge consumption.

At time tbf, NMOS transistor M1c turns off, and thereafter, at time tb, clock φ1a lowers to the ground potential GND, so that input node N1a is charged to the power supply potential Vcc. Therefore, intermediate node is subjected to capacitive coupling by capacitor C1, and the potential of intermediate node N2a attains to (3/2) Vcc.

Meanwhile, at time tb, clock φ1b rises to the power supply potential Vcc, and hence input node N1b is discharged to the ground potential GND. Therefore, intermediate node N2b is subjected to capacitive coupling by capacitor C1b, and the potential at intermediate node N2b attains to (½) Vcc+Vdif.

At time tbd, clocks φ3a and φ2b are raised to the power supply potential Vcc, whereby nodes N5a and N4b are boosted to 2Vcc−Vth by capacitive coupling. Thus NMOS transistors M3a and M2b are turned on. At this time, intermediate node N2a is discharged to the boosted potential Vpp by NMOS transistor M3a, and intermediate node N2b is charged to the power supply potential Vcc by NMOS transistor M2b. In this case, charges corresponding to {(½) Vcc−Vdif}·C are supplied to the boosted potential node Npp through NMOS transistor M3a. This is the second charge supply to the boosted potential node Npp. In this case, if the electrode 48 opposing to the boosted potential node Npp is at the ground potential, charges corresponding to {(½) Vcc−Vdif}·C move from the node having power supply potential Vcc to the electrode 48 (at the ground potential GND) opposing to the boosted potential node Npp through PMOS transistor M1a, input node N1a, capacitor C1a, intermediate node N2a and NMOS transistor M3a. This is the second charge consumption. At the same time, charges corresponding to {(½) Vcc−Vdif}·C move from the node having the power supply potential to the node having the ground potential GND through NMOS transistor M2b, intermediate node N2b, capacitor C1b, input node N1b and NMOS transistor M1b. This is the third charge consumption. The second and third charge consumptions occur simultaneously.

At time tcf, the next cycle starts at the transition of clocks φ1a and φ1b. Namely, one cycle is completed from time taf to time tcf.

The total charges consumed in one cycle from the node having the power supply potential Vcc to the node having the ground potential will be {(3/2) Vcc−3Vdif}·C. Meanwhile, charges supplied to the boosted potential node Npp is {Vcc−2Vdif}·C. Therefore, charge efficiency is 2/3. Namely, charge efficiency exceeds the charge efficiency of the conventional boosted potential generating circuit shown in FIG. 29, which was 50%. Therefore, as compared with the prior art, lower power consumption is realized. The above description is when the electrode 48 opposing to the boosted potential node Npp is at the ground potential GND.

When the electrode 48 opposing to the boosted potential node Npp is at the power supply potential Vcc, there is neither the first nor the second charge consumption. Therefore, the total charges consumed in one cycle from the node having the power supply potential Vcc to the node having the ground potential GND will be {(½) Vcc−Vdif}·C. Meanwhile, the charges supplied to the boosted potential node Npp correspond to {Vcc−2Vdif}·C. Namely, the charge efficiency is 2. That means the charge efficiency is 200%.

Though characteristic operation of the boosted potential generating circuit in accordance with the second embodiment has been described, other operations are similar to those of the boosted potential generating circuit in accordance with the first embodiment.

(Third Embodiment)

In the boosted potential generating circuit as the internal potential generating circuit in accordance with the third embodiment, the clocks φ2a, φ2b, φ3a and φ3b in the boosted potential generating circuit shown in FIG. 8 are level converted and input to capacitors C2a, C2b, C3a and C3b. Therefore, the operation of the boosted potential generating circuit in accordance with the third embodiment is similar to that of the boosted potential generating circuit in accordance with the second embodiment. Therefore, the boosted potential generating circuit in accordance with the third embodiment provides similar effects as the boosted potential generating circuit in accordance with the second embodiment.

Figure 10:
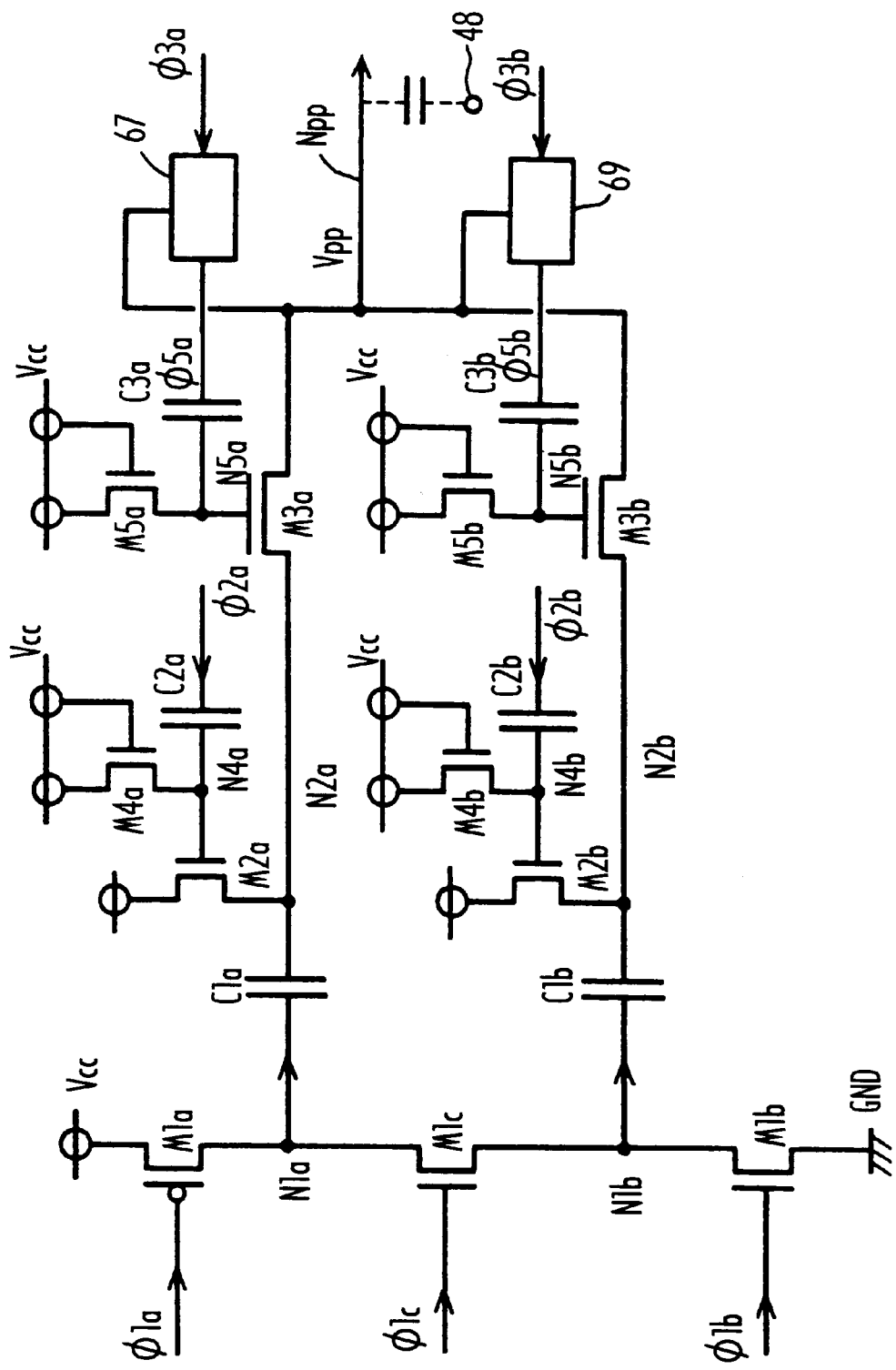
FIG. 10 is a circuit diagram showing details of a boosted potential generating circuit as an internal potential generating circuit in accordance with a third embodiment of the present invention.

FIG. 10 is a circuit diagram showing details of the boosted potential generating circuit as the internal potential generating circuit in accordance with the third embodiment. Portions similar to those of FIG. 8 are denoted by the same reference characters and description thereof is not repeated.

Referring to FIG. 10, the boosted potential generating circuit in accordance with the third embodiment includes, in addition to the boosted potential generating circuit shown in FIG. 8, level converting circuits 67 and 69. A clock φ5a provided by level conversion of clock φ3a by level converting circuit 67 is input to capacitor C3a. A clock φ5b obtained by level conversion of clock φ3b by level converting circuit 69 is input to capacitor C3b.

Level converting circuit 67 converts level of the clock φ3a of which voltage amplitude is the power supply potential Vcc, to provide clock φ5a of which voltage amplitude is the boosted potential Vpp. Level converting circuit 69 converts level of clock φ3b of which voltage amplitude is the power supply potential Vcc to provide clock φ5b of which voltage amplitude is the boosted potential Vpp. Therefore, the potentials at nodes N5a and N5b controlling the gate voltages of NMOS transistors M3a and M3b increase to Vcc+Vpp−Vth (=2Vcc+Vdif−Vth). Therefore, as compared with the boosted potential generating circuit in accordance with the second embodiment, nodes N5a and N5b have higher potentials, and voltage drop by the threshold voltage Vth of NMOS transistors M3a and M3b can be prevented.

Figure 11:
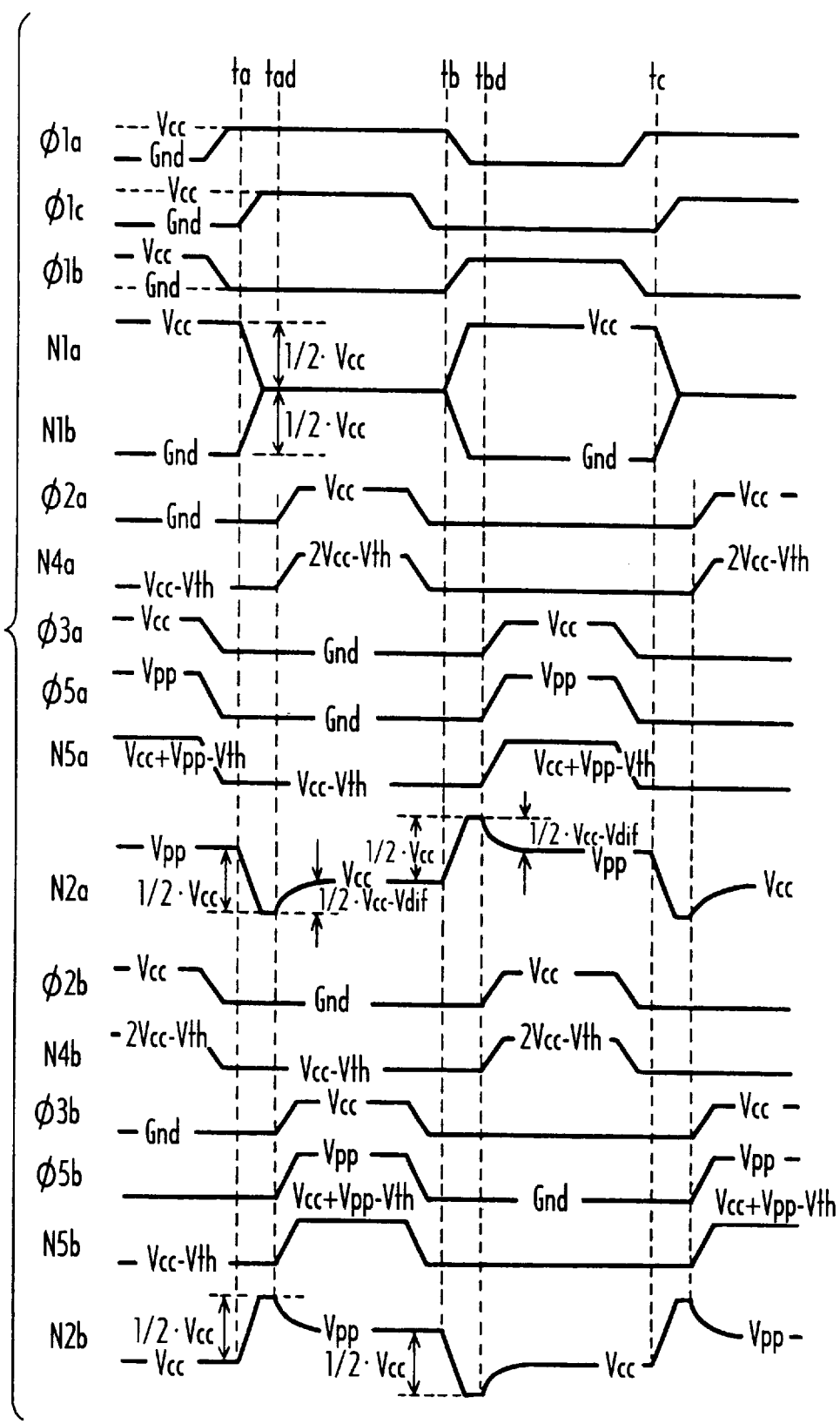
FIG. 11 is a timing chart showing the operation of the boosted potential generating circuit shown in FIG. 10.

FIG. 11 is a timing chart showing the operation of the boosted potential generating circuit shown in FIG. 10. Since the operation of the boosted potential generating circuit shown in FIG. 10 is similar to that of the boosted potential generating circuit shown in FIG. 8, only characteristic operation will be described.

Referring to FIG. 11, at time tad, clock φ3b is raised to the power supply potential Vcc. Level converting circuit 69 converts level of the clock φ3b which is at the power supply potential Vcc, and outputs clock φ5b, which is at the boosted potential Vpp, to capacitor C3b. In response, the potential at node N5b attains to Vcc+Vpp−Vth.

At time tbd, clock φ3a is raised to the power supply potential Vcc. At this time, level converting circuit 67 converts level of clock φ3a which is at the power supply potential Vcc, and provides clock φ5a which is at the boosted potential Vpp to capacitor C3a. In response, the potential at node N5a attains to Vcc+Vpp−Vth.

As described above, in the boosted potential generating circuit in accordance with the third embodiment, clocks φ5a and φ5b which have been level converted to have large voltage are input to capacitors C3a and C3b, whereby NMOS transistors M3a and M3b are turned on.

Therefore, in the boosted potential generating circuit in accordance with the third embodiment, voltage drop by the threshold voltage Vth of NMOS transistors M3a and M3b can be prevented, and charges can be injected to the boosted potential node Npp with high efficiency.

(Fourth Embodiment)

Figure 12:
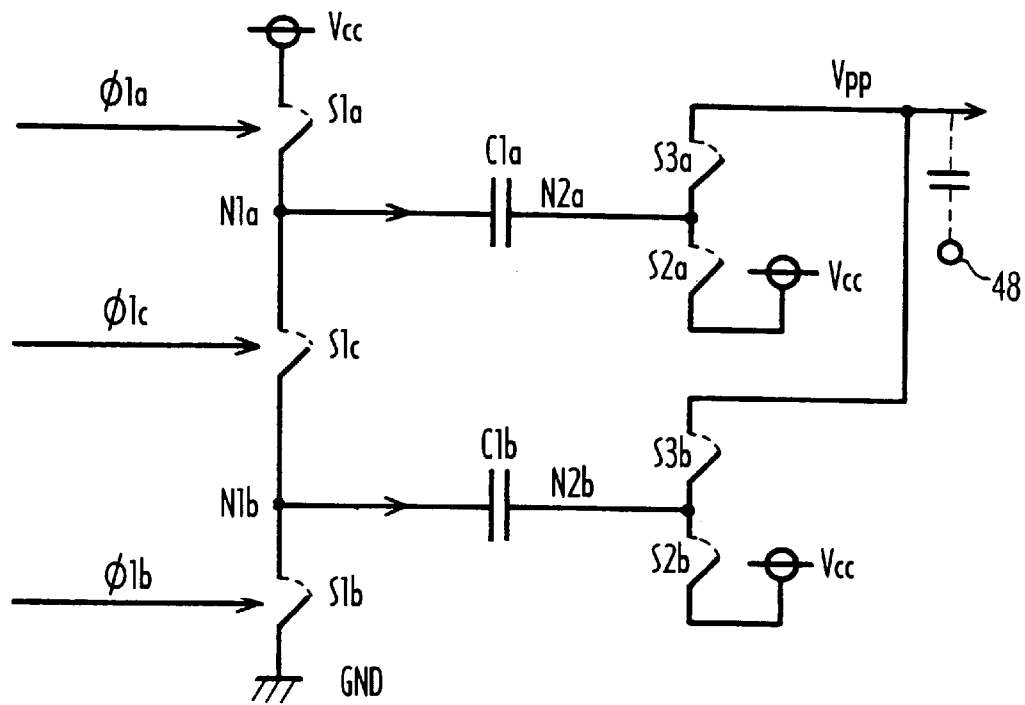
FIG. 12 is a circuit diagram showing details of a boosted potential generating circuit as an internal potential generating circuit in accordance with a fourth embodiment of the present invention.

FIG. 12 is a circuit diagram showing details of the boosted potential generating circuit as the internal potential generating circuit in accordance with the fourth embodiment. Portions corresponding to those of FIG. 4 are denoted by the same reference characters and description thereof is not repeated.

Referring to FIG. 12, in the boosted potential generating circuit according to the fourth embodiment, the PMOS transistor M1a of FIG. 4 is replaced by a switch S1a, the NMOS transistor M1b of FIG. 4 is replaced by a switch S1b, and the NMOS transistor M1c of FIG. 4 is replaced by switch S1c. Switch S1a operates in the similar manner as the PMOS transistor M1a shown in FIG. 4, in response to a clock φ1a which is similar to the clock φ1a shown in FIG. 4. Switch S1b operates in the similar manner as NMOS transistor M1b of FIG. 4, in response to a clock φ1b which is similar to the clock φ1b shown in FIG. 4. Switch S1c operates in the similar manner as NMOS transistor M1c of FIG. 4 in response to a clock φ1c which is similar to clock φ1c shown in FIG. 4.

As described above, the boosted potential generating circuit in accordance with the fourth embodiment operates in the similar manner as the boosted potential generating circuit in accordance with the first embodiment. Therefore, the boosted potential generating circuit in accordance with the fourth embodiment provides similar effects as the boosted potential generating circuit in accordance with the first embodiment.

(Fifth Embodiment)

Figure 13:
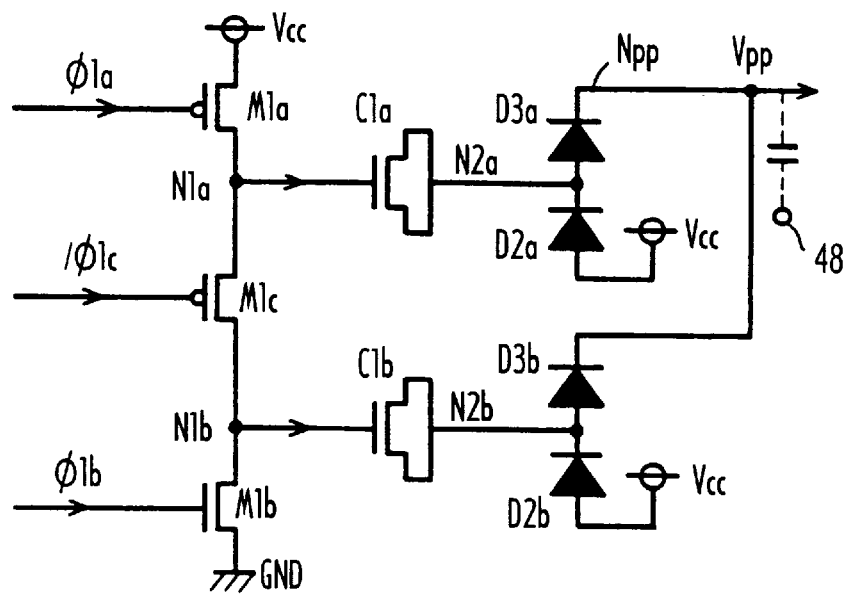
FIG. 13 is a circuit diagram showing details of a boosted potential generating circuit as an internal potential generating circuit in accordance with a fifth embodiment of the present invention.

FIG. 13 is a circuit diagram showing details of the boosted potential generating circuit as the internal potential generating circuit in accordance with the fifth embodiment. Portions similar to those of FIG. 4 are denoted by the same reference characters and description thereof is not repeated.

Referring to FIG. 13, the boosted potential generating circuit in accordance with the fifth embodiment includes PMOS transistors M1a, M1c, an NMOS transistor M1b, capacitors C1a, C1b, and diodes D2a, D2b, D3a and D3b. PMOS transistor M1c is connected between input nodes N1a and N1b. PMOS transistor M1c receives at its gate a clock /φ1c. Here, capacitors C1a and C1b are MOS capacitors. MOS capacitor C1a has its gate connected to input node N1a and its source and drain connected to intermediate node N2a. MOS capacitor C1b has its gate connected to input node N1b and its source and drain connected to intermediate node N2b. Diode D3a has its cathode connected to boosted potential node Npp and its anode connected to intermediate node N2a. Diode D2a has its cathode connected to intermediate node N2a, and its anode connected to the node having the power supply potential Vcc. Diode D3b has its cathode connected to boosted potential node Npp, and its anode connected to intermediate node N2b. Diode D2b has its cathode connected to intermediate node N2b, and its anode connected to the node having the power supply potential Vcc.

In the boosted potential generating circuit in accordance with the fifth embodiment, NMOS transistor M1c, capacitors C1a and C1b, and switches S3a, S2a, S3b and S2b are replaced by PMOS transistor M1c, MOS capacitors C1a and C1b, and diodes D3a, D2a, D3b and D2b operating in the similar manner, respectively. Therefore, the operation of the boosted potential generating circuit in accordance with the fifth embodiment is similar to that of the boosted potential generating circuit in accordance with the fourth embodiment. However, in the boosted potential generating circuit in accordance with the fifth embodiment, NMOS transistor M1c of FIG. 4 is replaced by PMOS transistor M1c, and hence the clock /φ1c input to PMOS transistor M1c is an inverted signal of clock φ1c shown in FIG. 4.

Figure 14:
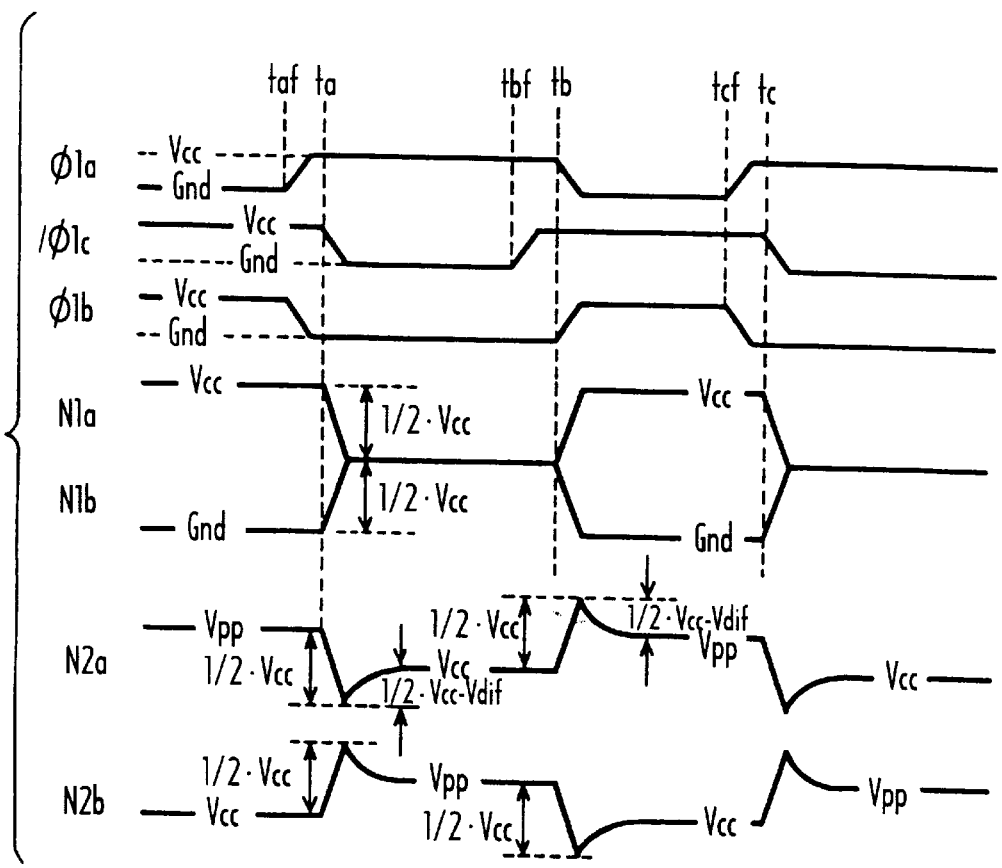
FIG. 14 is a timing chart showing the operation of the boosted potential generating circuit shown in FIG. 13.

FIG. 14 is a timing chart showing the operation of the boosted potential generating circuit shown in FIG. 13. As described above, clock /φ1c input to PMOS transistor M1c is an inverted signal of clock φ1c of FIG. 4. Therefore, at time ta, it is lowered from the power supply potential Vcc to the ground potential GND, and at time tbf, it is boosted from the ground potential GND to the power supply potential Vcc. Timings of transition of other clocks φ1a and φ1b and change in potentials at nodes N1a, N1b, N2a and N2b are the same as those shown in FIG. 5.

As described above, in the boosted potential generating circuit in accordance with the fifth embodiment, PMOS transistor M1c is provided as equalizing means, in place of the NMOS transistor M1c of FIG. 4. Therefore, the overall operation of the boosted potential generating circuit in accordance with the present invention is the same as that of the boosted potential generating circuit shown in FIG. 4 except that the clock input to the equalizing means has different polarity. Therefore, the boosted potential generating circuit in accordance with the fifth embodiment provides similar effects as the boosted potential generating circuit in accordance with the first embodiment.

Further, in the boosted potential generating circuit in accordance with the fifth embodiment, diode D2a is provided in place of an electric circuit including NMOS transistors M2a and M4a and a capacitor C2a of FIG. 8; diode D3a is provided in place of an electric circuit including NMOS transistors M3a, M5a and capacitor C3a of FIG. 8; diode D2b is provided in place of an electric circuit including NMOS transistors M2b and M4b and capacitor C2b of FIG. 8; and diode D3 is provided in place of an electric circuit including NMOS transistors N3b and M5b and capacitor C3b of FIG. 8.

Therefore, in the boosted potential generating circuit in accordance with the fifth embodiment, control clocks such as clocks φ2a, φ2b, φ3a and φ3b necessary in the boosted potential generating circuit in accordance with the second embodiment become unnecessary.

Further, the boosted potential generating circuit in accordance with the fifth embodiment may be used as the boosted potential generating circuit 23 of the DRAM shown in FIG. 1.

(Sixth Embodiment)

In the boosted potential generating circuit as the internal potential generating circuit in accordance with the sixth embodiment, an NMOS transistor is provided between intermediate nodes N2a and N2b of the boosted potential generating circuit shown in FIG. 4, and the NMOS transistor is adapted to be controlled by a clock.

Figure 15:
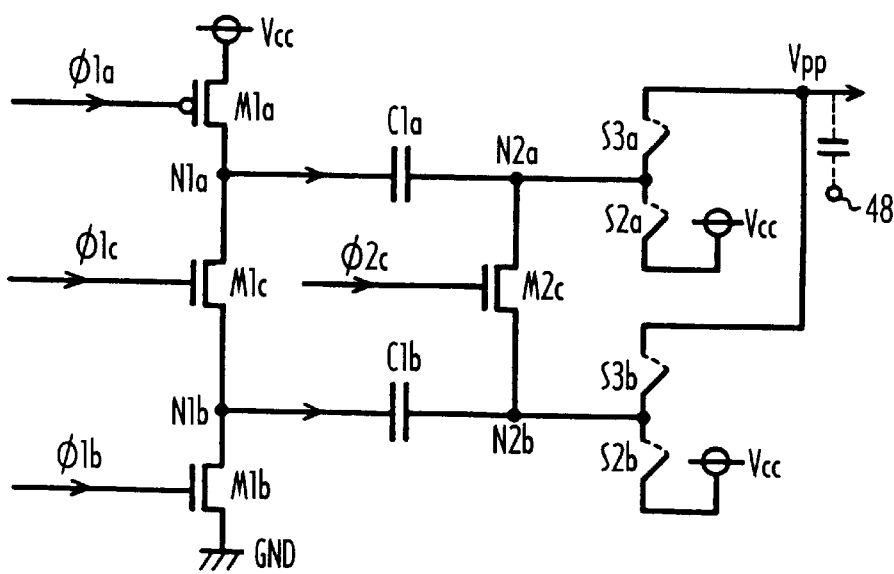
FIG. 15 is a circuit diagram showing details of a boosted potential generating circuit as an internal potential generating circuit in accordance with a sixth embodiment of the present invention.

FIG. 15 is a circuit diagram showing details of the boosted potential generating circuit as the internal potential generating circuit in accordance with the sixth embodiment of the present invention. Portions corresponding to those of FIG. 4 are denoted by the same reference characters and description thereof is not repeated.

Referring to FIG. 15, the boosted potential generating circuit in accordance with the sixth embodiment includes an NMOS transistor M2c between intermediate nodes N2a and N2b. NMOS transistor M2c receives a clock φ2c at its gate.

Figure 16:
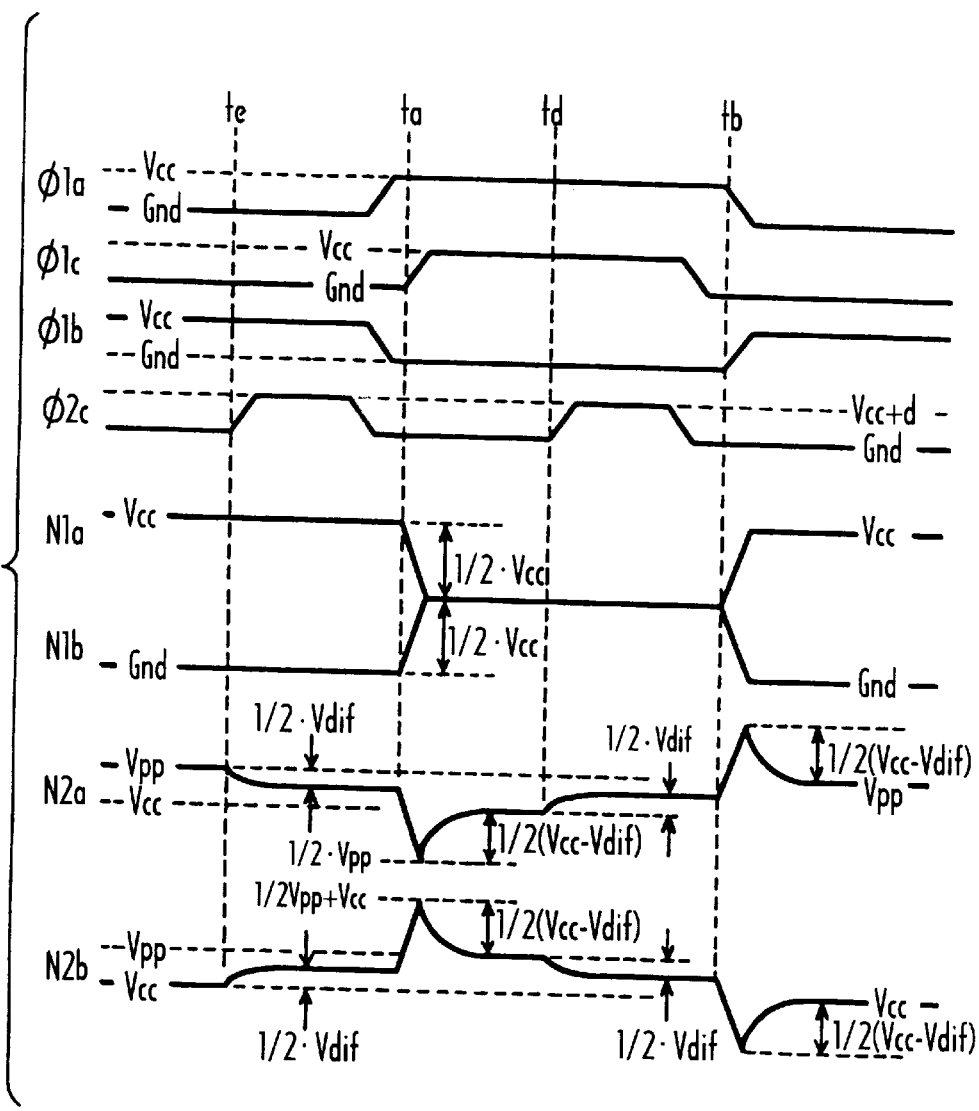
FIG. 16 is a timing chart showing the operation of the boosted potential generating circuit shown in FIG. 15.

FIG. 16 is a timing chart showing the operation of the boosted potential generating circuit shown in FIG. 15. It is assumed that Vpp−Vcc=Vdif.

Referring to FIGS. 15 and 16, at time te, clock φ2c rises to Vcc+α. Therefore, potentials at intermediate nodes N2a and N2b are equalized by NMOS transistor M2c serving as equalizing means, whereby the potentials at intermediate nodes N2a and N2b attain to {Vcc+(½) Vdif}. As a result, charges corresponding to ½Vdif move from the node having the power supply potential Vcc to the node having the ground potential GND through PMOS transistor M1a, input node N1a, capacitor C1a, intermediate node N2a, NMOS transistor M2c, intermediate node M2b, capacitor C1b, input node N1b and NMOS transistor M1b. This is the first charge consumption.

At time ta, clock φ1a rises to the power supply potential Vcc, and NMOS transistor M1c as equalizing means turns on. As a result, potentials at input nodes N1a and N1b are equalized, and the potentials at input nodes N1a and N1b attain to (½) Vcc. As input node N1a lowers to (½) Vcc at time ta, intermediate node N2a is subjected to capacitive coupling by capacitor C1a. Therefore, the potential at intermediate node N2a attains to (½) Vpp. Meanwhile, as input node N1b rises to (½) Vcc at time ta, intermediate node N2b is subjected to capacitive coupling by capacitor C1b. Therefore, the potential at intermediate node N2b attain to (½) Vpp+Vcc.

Immediately after time ta, intermediate node N2a is charged to the power supply potential Vcc by switch S2a, and intermediate node N2b is discharged to the boosted potential Vpp by switch S3b. At this time, charges corresponding to {(½) (Vcc−Vdif)}·C are supplied to boosted potential node Npp through switch S3b. This is the first charge supply to the boosted potential node Npp. In this case, if the electrode 48 opposing to the boosted potential node Npp is at the ground potential GND, charges corresponding to {(½) (Vcc−Vdif)}·C move from the node having the power supply potential Vcc to the electrode 48 (at the ground potential GND) opposing to the boosted potential node Npp through switch S2a, intermediate node N2a, capacitor C1a, input node N1a, NMOS transistor M1c, input node N1b, capacitor C1b, intermediate node N2b and switch S3b. This is the second charge consumption. If the electrode 48 opposing the boosted potential node Npp is at the power supply potential Vcc, there is not a movement of charges from the node having the power supply potential Vcc to the node having the ground potential GND.

At time td, clock φ2c rises to the power supply potential Vcc+α, potentials at intermediate nodes N2a and N2b are equalized, and potentials at intermediate nodes N2a and N2b are set to {Vcc+(½) Vdif}. Here, there is not a movement of charges from the power supply potential Vcc to the ground potential GND. During equalization by NMOS transistor M2c, equalization by NMOS transistor M1c is also performed as the clock φ1c is at the Vcc level.

At time tb, φ1a lowers to the ground potential GND, whereby node N1a is charged and its potential attains to the power supply potential Vcc. Therefore, intermediate node N2a is subjected to capacitive coupling by capacitor C1a, and its potential reaches (½ (3Vcc+Vdif). Meanwhile, at time tb, as clock φ1b rises to the power supply potential Vcc, input node N1b is discharged and its potential attains to the ground potential GND. Therefore, intermediate node N2b is subjected to capacitive coupling by capacitor C1b, and its potential attains to (½) (Vcc+Vdif).

Immediately after time tb, intermediate node N2a is discharged to the boosted potential Vpp by switch S3a, and intermediate node N2b is charged to the power supply potential Vcc by switch S2b. At this time, charges corresponding to {(½) (Vcc−Vdif)}·C are supplied to the boosted potential node Npp through switch S3a. This is the second charge supply to the boosted potential node Npp. In this case, if the electrode opposing to the boosted potential node Npp is at the ground potential GND, charges corresponding to $\{(½) (Vcc-Vdif)\}\cdot C$ move from the node having the power supply potential Vcc to the electrode 48 (at the ground potential GND) opposing to the boosted potential node Npp through PMOS transistor M1a, input node N1a, capacitor C1a, intermediate node N2a and switch S3b. This is the third charge consumption. If the electrode 48 opposing to the boosted potential node Npp is at the power supply potential Vcc, there is not a movement of charges from the node having the power supply potential Vcc to the node having the ground potential GND.

In addition, no matter whether the electrode 48 opposing to the boosted potential node Npp is at the ground potential GND or the power supply potential Vcc, charges corresponding to $\{(½) (Vcc-Vdif)\}\cdot C$ move from the node having the power supply potential Vcc to the node having the ground potential GND through switch S2b, intermediate node N2b, capacitor C1b, input node N1b and NMOS transistor M1b. This is the fourth charge consumption. The third and fourth charge consumptions occur simultaneously.

By the above described operation, one cycle of operation is completed. The total amount of charges consumed in one cycle from the node having the ground potential Vcc to the node having the ground potential GND will be $\{(3⁄2) Vcc-Vdif\}\cdot C$. Meanwhile, charges supplied to the boosted potential node Npp in one cycle will be $\{Vcc-Vdif\}\cdot C$. Therefore, if $Vdif=(¼) Vcc$, charge efficiency is 3⁄5. Namely, the charge efficiency of the boosted potential generating circuit in accordance with the sixth embodiment exceeds the charge efficiency of the conventional boosted potential generating circuit shown in FIG. 29, which was 50%. Therefore, as compared with the prior art, power consumption can be reduced.

Further, if the electrode 48 opposing to the boosted potential node Npp is at the power supply potential Vcc, there is neither the second nor third charge consumption. Therefore, the total amount of charges consumed in one cycle from the node having the power supply potential Vcc to the node having the ground potential GND will be $\{(½) Vcc\}\cdot C$. Meanwhile, charges supplied to the boosted potential node Npp in one cycle will be $\{Vcc-Vdif\}\cdot C$. Therefore, if $Vdif=(¼) Vcc$, charge efficiency is 3⁄2. Namely, the charge efficiency reaches 150%.

Here, the magnitude of the maximum boosted potential Vpp which can be generated by the boosted potential generating circuit in accordance with the sixth embodiment is, as can be seen from FIG. 16, 2Vcc. Namely, referring to FIG. 16, the boosted potential Vpp can be generated until ½{Vcc-Vdif} =0 is attained.

In this manner, the maximum boosted potential Vpp which can be generated by the boosted potential generating circuit in accordance with the sixth embodiment is the same as the maximum boosted potential Vpp which can be generated by the conventional boosted potential generating circuit shown in FIG. 29. However, as described above, charge efficiency in the boosted potential generating circuit in accordance with the sixth embodiment is higher than the prior art.

As described above, in the boosted potential generating circuit in accordance with the sixth embodiment, before the start of supply of the power supply potential Vcc (charges) by switch S2a to intermediate node N2a and injection of charges by switch S3b to boosted potential node Npp, that is, at time ta, potentials at input nodes N1a and N1b are equalized by NMOS transistor M1c as the equalizing means. Therefore, power supply potential Vcc (charges) supplied by switch S2a to intermediate node N2a can be utilized for charge injection by switch S3b to boosted potential node Npp. More specifically, the charges supplied to the first charge pumping circuit formed by capacitor C1a and switches S3a and S2a (charges consumed by the first charge pumping circuit) can be recycled by the second charge pumping circuit formed by capacitor C1b and switches S3b and S2b.

Therefore, in the boosted potential generating circuit in accordance with the sixth embodiment, charge consumption can be reduced and efficiency in generating the boosted potential Vpp (charge efficiency) can be improved. In other words, lower power consumption can be realized.

Further, in the boosted potential generating circuit in accordance with the sixth embodiment, after the start of injection of charges by switch S3b to the boosted potential node Npp and supply of the power supply potential Vcc (charges) by switch S2a to intermediate node N2a, that is, at time td, equalization of the potentials at intermediate nodes N2a and N2b is started by NMOS transistor M2c as the equalizing means. Therefore, the potential at intermediate node N2a increases by (½) Vdif, and the potential at intermediate node N2b lowers by (½)·Vdif.

Meanwhile, during equalization by NMOS transistor M2c, that is, after time td, the clock φ1c is at the power supply potential Vcc. This means that equalization by NMOS transistor M1c takes place simultaneously. Therefore, at time tb, when input node N1a attains to the power supply potential Vcc, the potential at intermediate node N2a rises from Vcc+(½) Vdif by (½) Vcc, because of capacitive coupling. In the boosted potential generating circuit shown in FIG. 4, at time tb, intermediate node N2a rises from power supply potential Vcc by (½) Vcc, as shown in FIG. 5.

Therefore, in the boosted potential generating circuit in accordance with the sixth embodiment, the maximum possible value of the boosted potential Vpp can be made higher than the maximum value of the boosted potential Vpp which can be generated by the boosted potential generating circuits in accordance with the first to fifth embodiments. More specifically, it is possible to provide the maximum value of the boosted potential which is the same as the maximum value of the boosted potential generated by the conventional boosted potential generating circuit shown in FIG. 29. However, the efficiency in generating the boosted potential (charge efficiency) is higher than the boosted potential generating circuit of the prior art shown in FIG. 29.

As described above, the boosted potential generating circuit in accordance with the sixth embodiment is inferior to the boosted potential generating circuit in accordance with the first to fifth embodiments in view of lower power consumption (though it is still higher than the conventional boosted potential generating circuit). However, it is especially suitable when large boosted potential Vpp is desirable.

A modification of the boosted potential generating circuit in accordance with the sixth embodiment will be described. The circuit structure of the modification of the boosted potential generating circuit in accordance with the sixth embodiment is the same as that of the boosted potential generating circuit in accordance with the sixth embodiment shown in FIG. 15.

Figure 17:
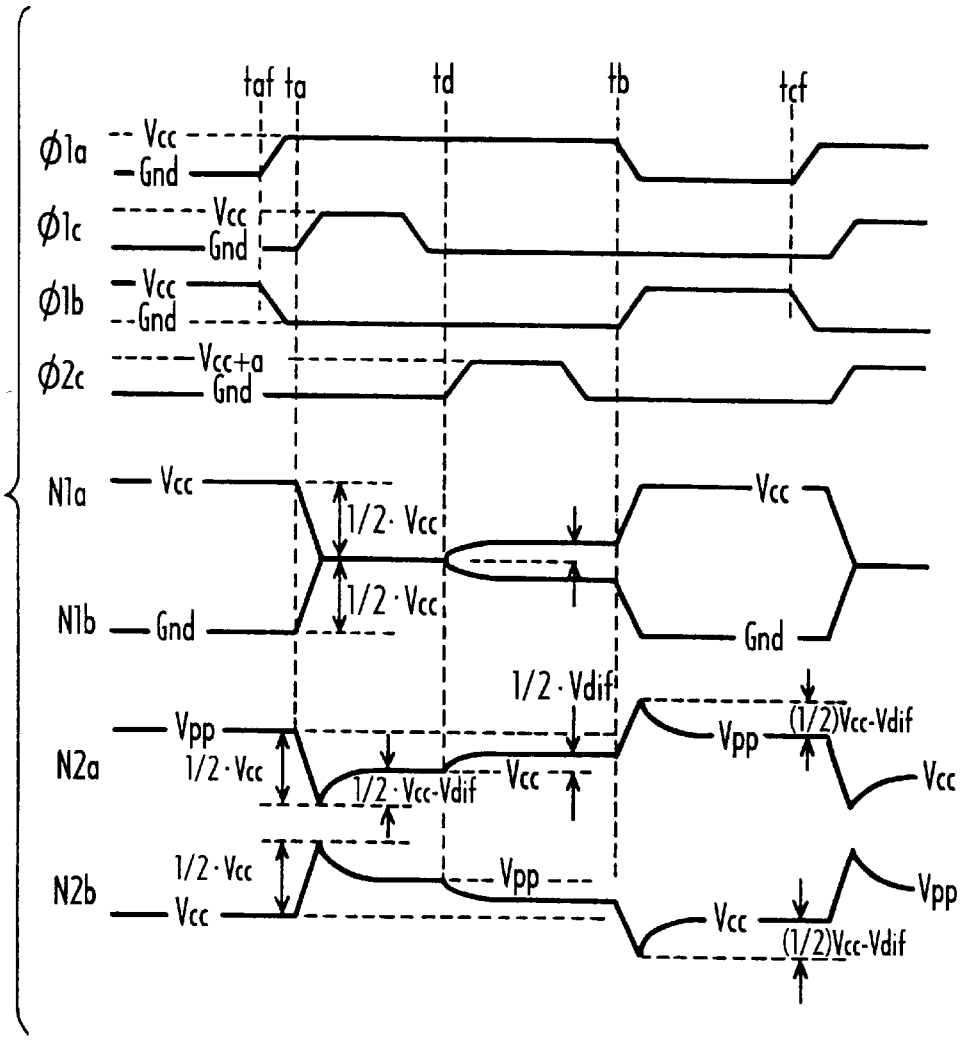
FIG. 17 is a timing chart showing the operation of a modification of the boosted potential generating circuit as the internal potential generating circuit in accordance with the sixth embodiment of the present invention.

FIG. 17 is a timing chart showing the operation of the modification of the boosted potential generating circuit in accordance with the sixth embodiment.

Referring to FIG. 17, the characteristic clock in the modification of the boosted potential generating circuit in accordance with the sixth embodiment resides in clocks φ1c and φ2c. In other words, the clocks φ1c and φ2c in the boosted potential generating circuit in accordance with the modification of the sixth embodiment differ from the clocks φ1c and φ2c of the boosted potential generating circuit in accordance with the sixth embodiment shown in FIG. 15, and therefore the boosted potential generating circuits come to have different operations. The frequency of clock φ2c of FIG. 16 is twice that of clock φ2c shown in FIG. 17.

Referring to FIG. 17, it is assumed that before time taf, input node N1a is at the power supply potential Vcc, input node N1b is at the ground potential GND, intermediate node N2a is at the boosted potential Vpp and intermediate node N2b is at the power supply potential Vcc.

At time ta, as φ1c rises to the power supply potential Vcc, NMOS transistor M1c turns on. As a result, the potentials at input nodes N1a and N1b are equalized by NMOS transistor M1c as equalizing means, and potentials at input nodes N1a and N1b attain to (½) Vcc. Further, at time ta, the potential at input node N1a lowers to (½) Vcc. Therefore, intermediate node N2a is subjected to capacitive coupling by capacitor C1a. Therefore, the potential at intermediate node N2a attains to (½) Vcc +Vdif. Meanwhile, at time ta, the potential at input node Nib increases to (½) Vcc, and hence the potential at intermediate node N2b is subjected to capacitive coupling by capacitor C1b. Therefore, the potential at intermediate node N2b attains to (3/2) Vcc.

Immediately after time ta, intermediate node N2a is charged to the power supply potential Vcc by switch S2a, and intermediate node N2b is discharged to the boosted potential Vpp by switch S3b. At this time, charges corresponding to {(½) Vcc−Vdif}·C are supplied through switch S3b to the boosted potential node Npp. This is the first charge supply to the boosted potential node Npp. In this case, if the electrode opposing to the boosted potential node Npp is at the ground potential GND, charges corresponding to {(½) Vcc−Vdif}·C move from the node having the power supply potential Vcc to the electrode (ground potential GND) opposing to the boosted potential node Npp through switch S2a, intermediate node N2a, capacitor C1a, input node N1a, NMOS transistor M1c, input node N1b, capacitor C1b, intermediate node N2b and switch S3b. This is the first charge consumption.

At time td, clock φ2c rises to the power supply potential Vcc+α, whereby NMOS transistor M2c turns on. As a result, the potentials at intermediate nodes N2a and N2b are equalized by NMOS transistor M2c as equalizing means. Consequently, the potentials at intermediate nodes N2a and N2b attain to Vcc+(½) Vdif. Further, at time td, as the intermediate node N2a changes, input node N1a is subjected to capacitive coupling. Consequently, the potential at input node N1a attains to (½) {Vcc+Vdif}. Meanwhile, at time tb, as the input node N2b changes, input node N1b is subjected to capacitive coupling. Therefore, the potential at input node N1b attains to (½) {Vcc−Vdif}. At this time, charges do not move from the node having the power supply potential Vcc to the node having the ground potential GND.

Here, during equalization by NMOS transistor M2c from time td, clock φ1c is at the ground potential GND, and NMOS transistor M1c as the equalizing means is off. Therefore, input nodes N1a and N1b are subjected to capacitive coupling by the change at the intermediate nodes N2a and N2b.

At time tb, when clock φ1a lowers to the ground potential GND, input node N1a is charged and its potential attains to the ground potential Vcc. Therefore, intermediate node N2a is subjected to capacitive coupling, and the potential attains to (3/2) Vcc. Meanwhile, at time tb, as clock φ1b rises to the power supply potential Vcc, input node N1b is discharged and its potential attains to the ground potential GND. Consequently, intermediate node N2b is subjected to capacitive coupling, and its potential attains to (½) Vcc+Vdif.

Immediately after time tb, intermediate node N2a is discharged to the boosted potential Vpp by switch S3a, and intermediate node N2b is charged to the power supply potential Vcc by switch S2b. At this time, charges corresponding to {(½) Vcc−Vdif}·C are supplied to the boosted potential node Npp through switch S3a. More specifically, this is the second charge supply to the boosted potential node Npp. In this case, if the electrode 48 opposing to the boosted potential node Npp is at the ground potential GND, charges corresponding to {(½) Vcc−Vdif}·C move from the node having the power supply potential Vcc to the electrode 48 (ground potential GND) opposing to the boosted potential node Npp through PMOS transistor M1a, input node N1a, capacitor C1a, intermediate node N2a and switch S3a. This is the second charge consumption. At the same time, charges corresponding to {(½) Vcc−Vdif}·C move from the node having the power supply potential Vcc to the node having the ground potential GND through switch S2b, intermediate node N2b, capacitor C1b, input node N1b and NMOS transistor M1b. This is the third charge consumption. The second and third charge consumption occur simultaneously.

At time tcf, operation of the next cycle starts. In other words, one cycle of operation is completed from time taf to time tcf. When the opposing electrode 48 is at the ground potential GND, the total amount of charges consumed in one cycle from the node having the power supply potential Vcc to the node having the ground potential GND will be {(3/2) Vcc−3Vdif}·C. Meanwhile, charges supplied to the boosted potential node Npp in one cycle correspond to {Vcc−2Vdif}C. Namely, charge efficiency is ⅔. Namely, it exceeds the charge efficiency of the conventional boosted potential generating circuit shown in FIG. 29, which was 50%. Therefore, power consumption lower than the prior art can be realized.

When the electrode 48 opposing to the boosted potential node Npp is at the power supply potential Vcc, current flows to the opposing electrode 48 (power supply potential Vcc) when charges are supplied to the boosted potential node Npp, and therefore there is not a movement of charges. Therefore, there is neither the first nor the second charge consumption. Therefore if the opposing electrode 48 is at the power supply potential Vcc, the total amount of charges consumed in one cycle from the node having the power supply potential Vcc to the ground potential GND is {(½) Vcc−Vdif}·C. Meanwhile, the charges supplied to the boosted potential node Npp in one cycle correspond to {Vcc−2dif}·C. Therefore, charge efficiency is 2. In other words, the charge efficiency attains to 200%.

As described above, in the modification of the boosted potential generating circuit in accordance with the sixth embodiment, before the start of supply of power supply potential Vcc (charges) by switch S2a to intermediate node N2a and injection of charges by switch S3b to boosted potential node Npp, that is, at time ta, charges at input nodes N1a and N1b are equalized by NMOS transistor M1c as equalizing means. Therefore, the power supply potential Vcc (charges) supplied to intermediate node N2a by switch S2a can be utilized for injection of charges by switch S3b to boosted potential node Npp. Namely, the charges consumed by the first charge pumping circuit including capacitor C1a and switches S3a and S2a can be recycled by the second charge pumping circuit including capacitor C1b and switches S3b and S2b. Consequently, in the modification of the boosted potential generating circuit in accordance with the sixth embodiment, charges consumed can be reduced, and efficiency in generating the boosted potential Vpp (charge efficiency) can be improved. In other words, lower power consumption is realized.

Further, in the modification of the boosted potential generating circuit in accordance with the sixth embodiment, before the start of equalization of NMOS transistor N2c as the equalizing means, NMOS transistor N1c as the equalizing means is turned off. Therefore, when equalization by NMOS transistor M2c is started at time td and potentials at nodes N2a and N2b change, the potentials at input nodes N1a and N1b change by capacitive coupling. Therefore, even if the input node N1a is set to the power supply potential Vcc and the potential of the input node N1b is set to the ground potential GND at time tb, the change in potentials at input nodes N1a and N1b can be reduced. Therefore, the maximum value of the potential generated in the boosted potential generating circuit in order to generate the boosted potential, that is, the maximum value of the possible boosted potential Vpp can be made smaller than in the boosted potential generating circuit of the prior art shown in FIG. 29.

Therefore, in the modification of the boosted potential generating circuit in accordance with the sixth embodiment, generation of a potential of an unnecessarily large magnitude therein can be prevented, and hence lower power consumption can be realized. The maximum value of the boosted potential which can be generated by the modification of the embodiment is ($3/2$) Vcc, while it is 2Vcc in the prior art example shown in FIG. 29.

(Seventh Embodiment)

Figure 18:
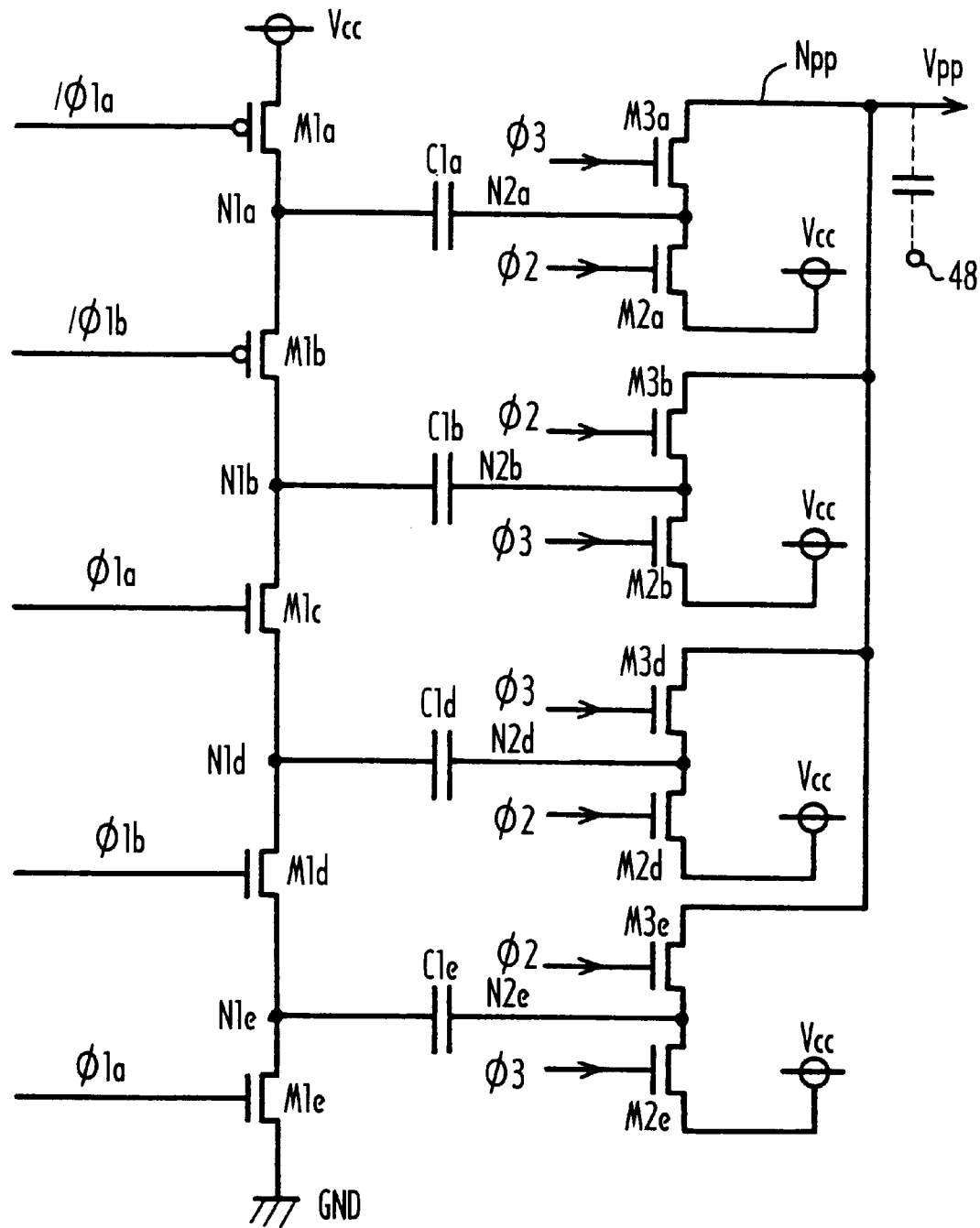
FIG. 18 is a circuit diagram showing details of a boosted potential generating circuit as an internal potential generating circuit in accordance with a seventh embodiment of the present invention.

FIG. 18 is a circuit diagram showing details of the boosted potential generating circuit as an internal potential generating circuit in accordance with a seventh embodiment.

Referring to FIG. 18, the boosted potential generating circuit in accordance with the seventh embodiment of the present invention includes PMOS transistors M1a, M1b, NMOS transistors M1c, M1d, M1e, M3a, M2a, M3b, M2b, M3d, M2d, M3e and M2e, and capacitors C1a, C1b, C1d, and C1e.

PMOS transistors M1a and M1b and NMOS transistors M1c, M1d, and M1d are connected in series between a node having the power supply potential Vcc and a node having the ground potential GND. To the gates of PMOS transistors M1a, M1b and NMOS transistors M1c, M1d and M1e, clocks /φ1a, /φ1b, φ1a, φ1b and φ1a are input, respectively. Capacitor C1a is provided between input node N1a and intermediate node N2a. Capacitor C1b is provided between input node N1b and intermediate node N2b. Capacitor C1b is provided between input node N1b and intermediate node N2d. Capacitor C1e is provided between input node N1e and intermediate node N2e.

NMOS transistors N3a and N2a are provided in series between the boosted potential node Npp and the node having the power supply potential Vcc. NMOS transistors M3b and M2b are provided in series between the boosted potential node Npp and the node having the power supply potential Vcc. NMOS transistors M3b and M2d are provided in series between the boosted potential node Npp and the node having the power supply potential. NMOS transistors M3e and M2e are provided in series between the boosted potential node Npp and the node having the power supply potential. To the gates of NMOS transistors M3a, M2a, M3b, M2b, M3d, M2e, M3e and M2e, clocks φ3, φ2, φ2, φ3, φ3, φ2, φ2 and φ3 are input, respectively.

Figure 19:
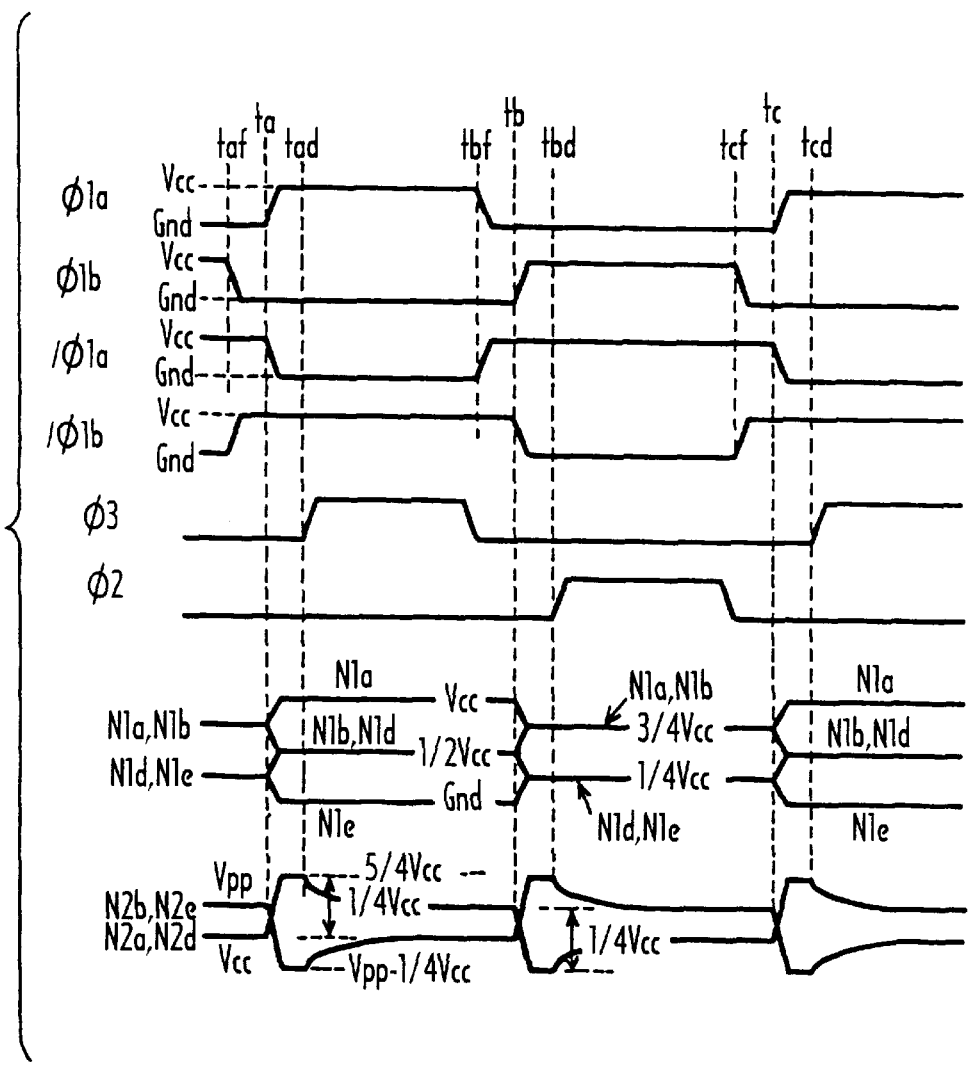
FIG. 19 is a timing chart showing the operation of the boosted potential generating circuit shown in FIG. 18.

FIG. 19 is a timing chart showing the operation of the boosted potential generating circuit shown in FIG. 18. It is assumed that Vpp−Vcc=Vdif.

Referring to FIG. 19, clocks φ1a and /φ1a are complementary clocks, and φ1b and /φ1b are complementary clocks. Amplitude of clocks φ1a, /φ1a, φ1b and /φ1b is the power supply potential Vcc.

Assume that before time taf, input nodes N1a and N1b are at ($3/4$) Vcc, input nodes N1d and N1e are at ($1/4$) Vcc, intermediate nodes N2a and N2d are at Vcc and intermediate nodes N2b and N2e are at Vpp.

First, consider input nodes N1a, N1b, N1d and N1e.

At time taf, φ1b is lowered to the ground potential GND, whereby PMOS transistor M1b and NMOS transistor M1d are turned off. At time ta, clock φ1a is raised to the power supply potential Vcc, whereby PMOS transistor M1a and NMOS transistors M1c and M1e are turned on. As a result, at time ta, input node N1a is charged to the power supply potential Vcc, and the potentials at input nodes N1b and N1d are equalized to ($1/2$) Vcc, and input node N1e is discharged to the ground potential GND.

At time tbf, clock φ1a is lowered to the ground potential GND, whereby PMOS transistor M1a and NMOS transistors M1c and M1e are turned off. Further, at time tb, clock φ1b is raised to the power supply potential Vcc, whereby PMOS transistor M1b and NMOS transistor M1d are turned on. As a result, at time tb, potentials at input nodes N1a and N1b are equalized to ($3/4$) Vcc, and the potentials at input nodes N1d and N1e are equalized to ($1/4$) Vcc. At time tcf, operations of the next cycle starts. Namely, at time tcf, the same operation as at time taf is performed. Thus the operation of one cycle is completed. In other words, an operation of one cycle is completed from time taf to tcf.

In summary, input nodes N1a, N1b, N1d and N1e each oscillate with an amplitude of ($1/4$) Vcc in a period of tc to ta.

Next, consider intermediate nodes N2a, N2b, N2d and N2e.

Before time ta, potentials at intermediate nodes N2b and N2e are at the boosted potential node Npp, and the potentials at intermediate nodes N2a and N2d are at the power supply potential Vcc. At time ta, intermediate nodes N2a and N2d are subjected to capacitive coupling by input nodes N1a and N1d, and the potentials change from the power supply potential Vcc to ($5/4$) Vcc. At time ta, intermediate nodes N2b and N2e are subjected to capacitive coupling by input nodes N1b and N1e, and the potentials change from the boosted potential Vpp to Vpp−($1/4$) Vcc.

At time tad, by the activation of clock φ3, that is, change to the "H" level, NMOS transistors M3a, M2b, M3d and M2e turned on. Consequently, at time tad, intermediate nodes N2a and N2d are discharged from ($5/4$) Vcc to Vpp, and intermediate nodes N2b and N2e are charged from Vpp−($1/4$) Vcc to Vcc. These are the first and second charge supplies. The first and second charge supplies. The first and second charge supplies occur simultaneously. In this case, charges corresponding to {($1/4$) Vcc−Vdif}·C move from the node having the power supply potential Vcc to the electrode 48 (ground potential GND) opposing to the boosted potential node Npp through PMOS transistor M1a, input node N1a, capacitor C1a, intermediate node N2a and NMOS transistor M3a. This is the first charge consumption. At the same time, charges corresponding to {($1/4$) Vcc−Vdif}·C move from the node having the power supply potential Vcc to the electrode 48 (ground potential GND) opposing to the boosted potential node Npp through NMOS transistor M2b, intermediate node N2b, capacitor C1b, input node N1b, NMOS transistor N1c, input node N1d, capacitor C1d, intermediate node N2d and NMOS transistor M3d. This is the second charge consumption. Further, at the same time, charges corresponding to {(¼) Vcc−Vdif}·C move from the node having the power supply potential Vcc to the node having the ground potential GND through NMOS transistor M2e, capacitor C1e, input node N1e and NMOS transistor M1e. This is the third charge consumption. The first to third charge consumptions occur simultaneously.

At time tb, intermediate nodes N2a and N2d are subjected to capacitive coupling by input nodes N1a and N1d, and potentials thereof change from the boosted potential Vpp to Vpp−(¼) Vcc. At time tb, input nodes N2b and N2e are subjected to capacitive coupling by input nodes N1b and N1e, and potentials thereof change from the power supply potential Vcc to (5/4) Vcc.

At time tbd, by activation of clock φ2, that is, by the change to the "H" level, NMOS transistors M2a, M3b, M2d and M3e are turned on. Consequently, intermediate nodes N2b and N2e are discharged from (5/4) Vcc to Vpp, and intermediate nodes N2a and N2d are charged from Vpp (¼) Vcc to Vcc. Namely, third and fourth charge supplies. The third and fourth charge supplies occur simultaneously. In this case, charges corresponding to {(1/4) Vcc−Vdif}·C move from the node having the power supply potential Vcc to the electrode 48 (ground potential GND) opposing to the boosted potential node Npp through NMOS transistor M2a, intermediate node N2a, capacitor C1a, input node N1a, PMOS transistor M1b, input node M1b, capacitor C1b, intermediate node N2b and NMOS transistor M3b. This is the fourth charge consumption. Simultaneously, charges corresponding to {(¼) Vcc−Vdif}·C move from the node having the power supply potential Vcc to the electrode 48 (ground potential GND) opposing to boosted potential node Npp through NMOS transistor M2d, intermediate node N2d, capacitor C1d, input node N1d, NMOS transistor M1d, input node N1e, capacitor C1e, intermediate node M2e and NMOS transistor M3e. This is the fifth charge consumption. The operation of the next cycle starts at time tcf. Namely, one cycle of operation completes from taf to tcf. The fourth and fifth charge consumptions occur simultaneously.

The total amount of charges consumed in one cycle from the node having the power supply potential Vcc to the node having the ground potential GND is {(¼) Vcc Vdif}·C. Meanwhile, the amount of charges supplied to the boosted potential node Npp in one cycle is 4·{(¼) Vc−Vdif}·C. Therefore, charge efficiency is ⅘. In other words, the charge efficiency is 80%, which exceeds the charge efficiency of the conventional boosted potential generating circuit shown in FIG. 29, which was 50%. Therefore, power consumption lower than the prior art can be realized.

Further, if the electrode 48 opposing the boosted potential node Npp is at the power supply potential Vcc, the first, second, fourth and fifth charge consumptions do not occur. Therefore, the total amount of charges consumed in one cycle from the node having the power supply potential Vcc to the node having the ground potential GND is {(¼) Vcc−Vdif}·C. Meanwhile, the amount of charges supplied to the boosted potential node Npp in one cycle is 4·{(¼) Vcc−Vdif}·C. Therefore, charge efficiency is 4, that is, 400%.

As described above, in the boosted potential generating circuit in accordance with the seventh embodiment, charge efficiency is 80% or 400%, and hence charge efficiency is superior to the conventional boosted potential generating circuit. Further, the boosted potential Vpp can be generated within the range satisfying Vcc≦Vpp≦(5/4) Vcc. In the conventional boosted potential generating circuit (FIG. 29), the possible boosted potential is 2Vcc. From the foregoing, it is understood that the boosted potential generating circuit in accordance with the seventh embodiment realizes lower power consumption.

(Eighth Embodiment)

Figure 20:
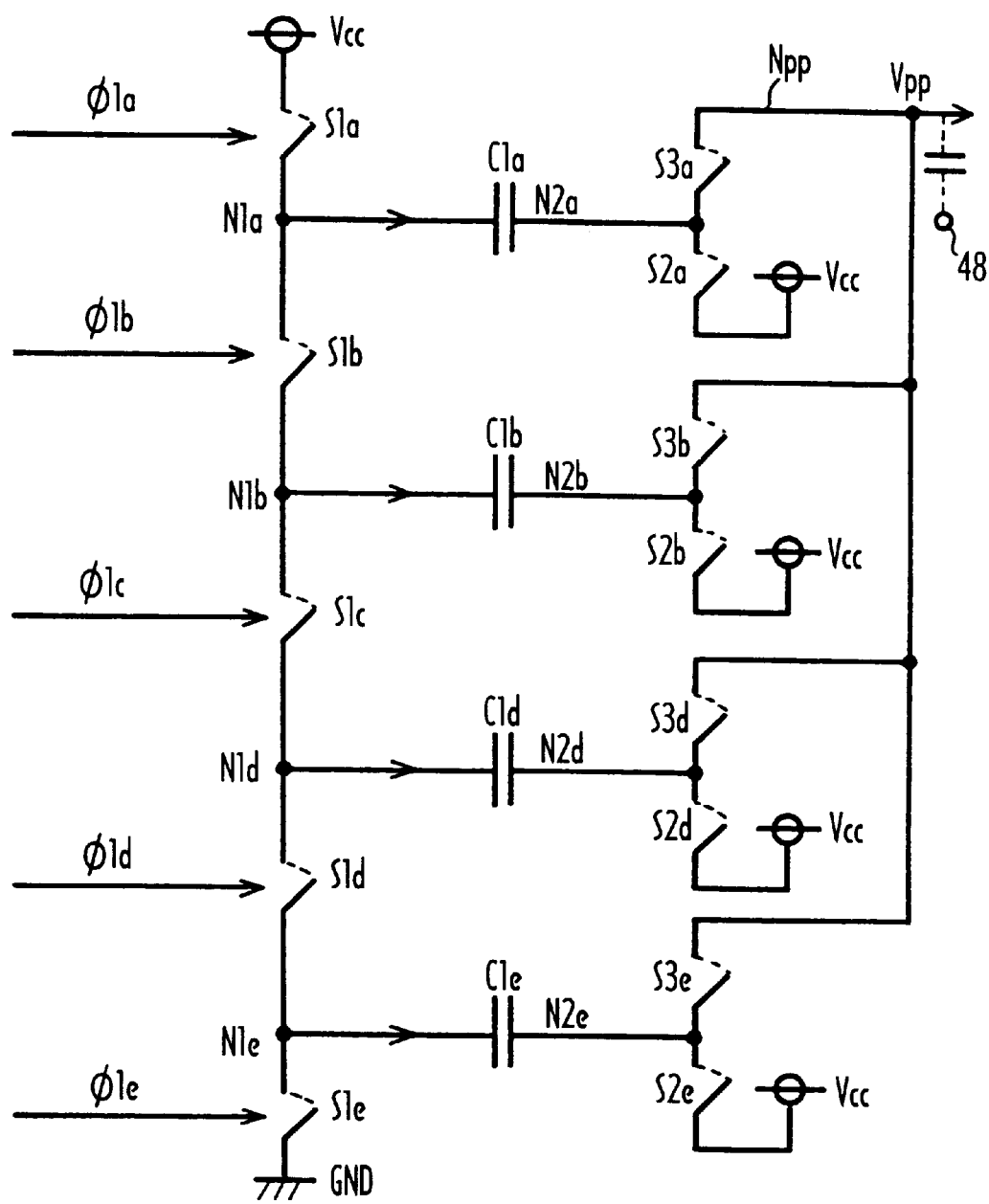
FIG. 20 is a circuit diagram showing details of a boosted potential generating circuit as an internal potential generating circuit in accordance with an eighth embodiment of the present invention.

FIG. 20 is a circuit diagram showing details of the boosted potential generating circuit as the internal potential generating circuit in accordance with the eighth embodiment. Portions corresponding to those of FIG. 18 are denoted by the same reference characters and description thereof is not repeated.

In the boosted potential generating circuit of FIG. 20, PMOS transistors M1a and M1b and NMOS transistors M1c, M1d, M1e, M3a, M2a, M3b, M2b, M3d, M2d, M3e and M2e of FIG. 18 are replaced by switches S1a, S1b, S1c, S1d, S1e, S3a, S2a, S3b, S2b, S3d, S2d, S3e and S2e. Switch S1a receives clock φ1a which is similar to clock /φ1a of FIG. 18 and operates in the similar manner as PMOS transistor M1a of FIG. 18. Switch S1b receives clock φ1b which is similar to clock /φ1b of FIG. 18 and operates in the similar manner as PMOS transistor M1b of FIG. 18. Switch S1c receives clock φ1c which is similar to φ1a of FIG. 18 and operates in the similar manner as NMOS transistor M1c of FIG. 18. Switch S1d receives clock φ1d which is similar to clock φ1b of FIG. 18 and operates in the similar manner as NMOS transistor M1d of FIG. 18. Switch S1e receives clock φ1e which is similar to clock φ1a of FIG. 18 and operates in the same manner as NMOS transistor M1e of FIG. 18. Switches S3a, S2a, S3b, S2b, S3d, S2d, S3e and S2e operate in the same manner as NMOS transistors M3a, M2a, M3b, M2b, M3d, M2d, M3e and M2e of FIG. 18, respectively.

Therefore, the boosted potential generating circuit in accordance with the eighth embodiment operate in the similar manner as the boosted potential generating circuit in accordance with the seventh embodiment. Therefore, the boosted potential generating circuit in accordance with the eighth embodiment provides similar effects as the boosted potential generating circuit in accordance with the seventh embodiment.

(Ninth Embodiment)

Figure 21:
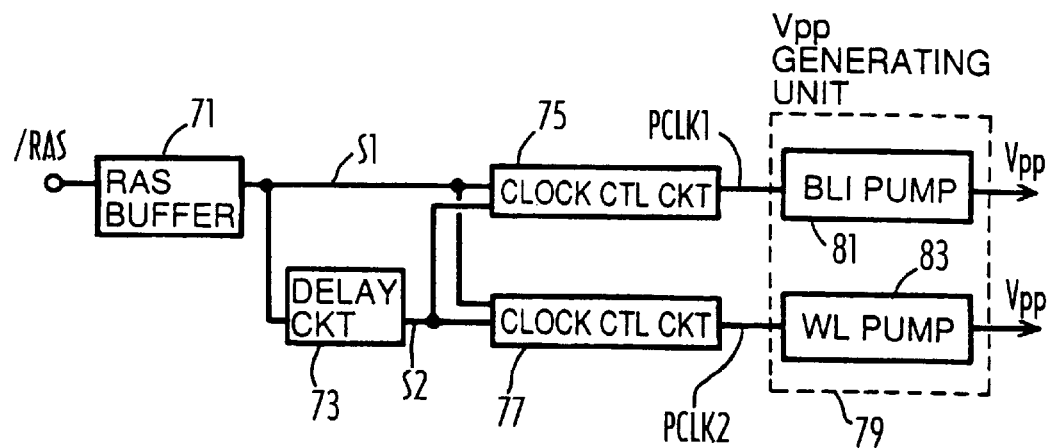
FIG. 21 is a schematic block diagram showing a portion of a DRAM containing a boosted potential generating unit in accordance with a ninth embodiment of the present invention.

FIG. 21 is a schematic block diagram showing a portion of a DRAM incorporating a boosted potential generating unit (Vpp generating unit) in accordance with the ninth embodiment.

Referring to FIG. 21, the portion of the DRAM includes an RAS buffer 71, a delay circuit 73, clock control circuits 75 and 77, and a boosted potential generating unit 79. The boosted potential generating unit includes BLI pump 81 and a WL pump 83.

RAS buffer 71 receives an external row address strobe signals /RAS. RAS buffer 71 outputs a signal S1. Delay circuit 73 outputs a signal S2 which is obtained by delaying signal S1. Clock control circuits 75 and 77 operate, receiving signals S1 and S2. Clock control circuit 75 has similar structure as the clock control circuit including AND circuit 63, OR circuit 65 and inverter 59 of FIG. 6. Clock control circuit 77 is also the same.

BLI pump 81 operates, receiving a pump clock PCLK1 from clock control circuit 75. WL pump 83 operates, receiving pump clock PCLK2 from clock control circuit 77. The boosted potential Vpp generated by BLI pump 81 is used for charging a bit line isolation signal transmitting line in the memory cell array. The bit line isolation signal transmitting line corresponds to the bit line isolation signal transmitting lines BLI1 and BLI2 of FIG. 3. The boosted potential Vpp generated from WL pump 83 is used for charging word lines in the memory cell array. The word line corresponds to word line WL of FIG. 3.

Any of the boosted potential generating circuits in accordance with the first to eighth embodiments may be used for each of the BLI pump 81 and WL pump 83. Therefore, if the boosted potential generating circuit (FIG. 4) in accordance with the first embodiment is used as BLI pump 81, pump clock PCLK1 corresponds to clocks φ1a, φ1b and φ1c.

The overall structure of the DRAM in accordance with the ninth embodiment is similar to the DRAM of FIG. 1. In this case, the boosted potential generating unit 79 of FIG. 21 is used as the boosted potential generating circuit 23 of FIG. 1.

As described above, in the boosted potential generating unit in accordance with the ninth embodiment, the boosted potential generating circuit in accordance with any of the first to eighth embodiments is used for each of BLI pump 81 and WL pump 79 constituting the boosted potential generating unit. Therefore, the boosted potential generating unit in accordance with the ninth embodiment provides similar effects as any of the boosted potential generating units in accordance with the first to eighth embodiments.

(Tenth Embodiment)

Figure 22:
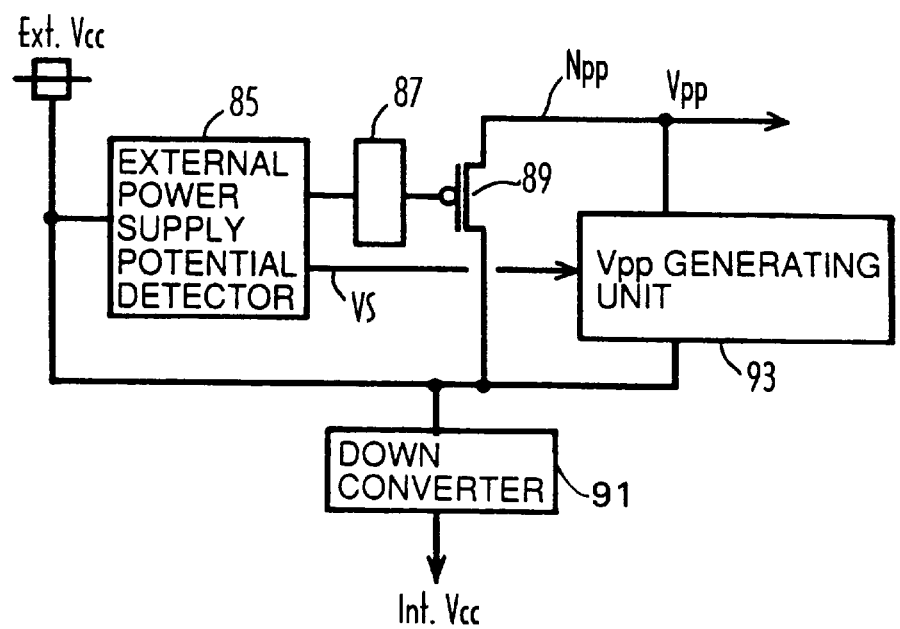
FIG. 22 is a schematic block diagram showing a boosted potential generating unit in accordance with a tenth embodiment of the present invention.

FIG. 22 is a schematic block diagram showing a boosted potential generating unit in accordance with the tenth embodiment.

Referring to FIG. 22, the boosted potential generating unit in accordance with the tenth embodiment includes an external power supply potential detector 85, a level shifter 87, a PMOS transistor 89, a down converter 91 and a boosted potential generating circuit 93.

The operation of the boosted potential generating unit shown in FIG. 22 will be described, assuming that the desired boosted potential, that is, the target boosted potential is Vppd. External power supply potential detector 85 detects potential level of an external power supply potential extVcc. When the target boosted potential Vppd is smaller than the external power supply potential extVcc, external power supply potential detector 85 outputs a signal at the level of the ground potential GND to level shifter 87. In response, level shifter 87 inputs the signal at the GND level to the gate of PMOS transistor 89. As a result, when the target booted potential Vppd is smaller than the external power supply potential extVcc, PMOS transistor 89 turns on. Through PMOS transistor 89, the external power supply potential extVcc is supplied as the boosted potential Vpp, to boosted potential node Npp. Meanwhile, if the target boosted potential Vppd is smaller than the external power supply potential extVcc, the boosted potential generating circuit 93 has its operation stopped by the boosted potential generating circuit control signal VS generated from external power supply potential detector 85.

If the target boosted potential Vppd is the external power supply potential extVcc or higher, external power supply potential detector 85 outputs a signal at the level of the external power supply potential extVcc to level shifter 87. Level shifter 87 shifts the signal which is at the level of the external power supply potential extVcc to a higher potential level, and inputs it to the gate of PMOS transistor 89. Consequently, PMOS transistor 89 turns off. Meanwhile, if the target boosted potential Vppd is the external power supply potential extVcc or higher, external power supply potential detector 85 generates boosted potential generating circuit control signal VS to operate the boosted potential generating circuit 93. Boosted potential generating circuit 93 boosts the external power supply potential extVcc and generates the boosted potential Vpp at the boosted potential node Npp. The boosted potential Vpp generated at the boosted potential node is used for charging the bit line isolation signal transmitting lines BLI1 and BLI2, word lines WL, and the bit line equalizing signal transmitting line EQL such as shown in FIG. 3.

The magnitude of the potential of the input external power supply potential extVcc differs as described above, because of the following reasons. Generally, in a DRAM, use of an external power supply potential extVcc within the specification (for example, 2V to 4V) is allowed. Therefore, if the target boosted potential Vppd is 3V and the external power supply potential extVcc is 4V, then PMOS transistor 89 is turned on and the external power supply potential extVcc is supplied to the boosted potential node Npp. Meanwhile, if the target boosted potential is 3V and the external power supply potential extVcc is 2V, the boosted potential Vpp is generated at boosted potential node Npp by boosted potential generating circuit 93. The down converter 91 is provided for generating an internal power supply potential intVcc by lowering the external power supply potential extVcc.

Figure 23:
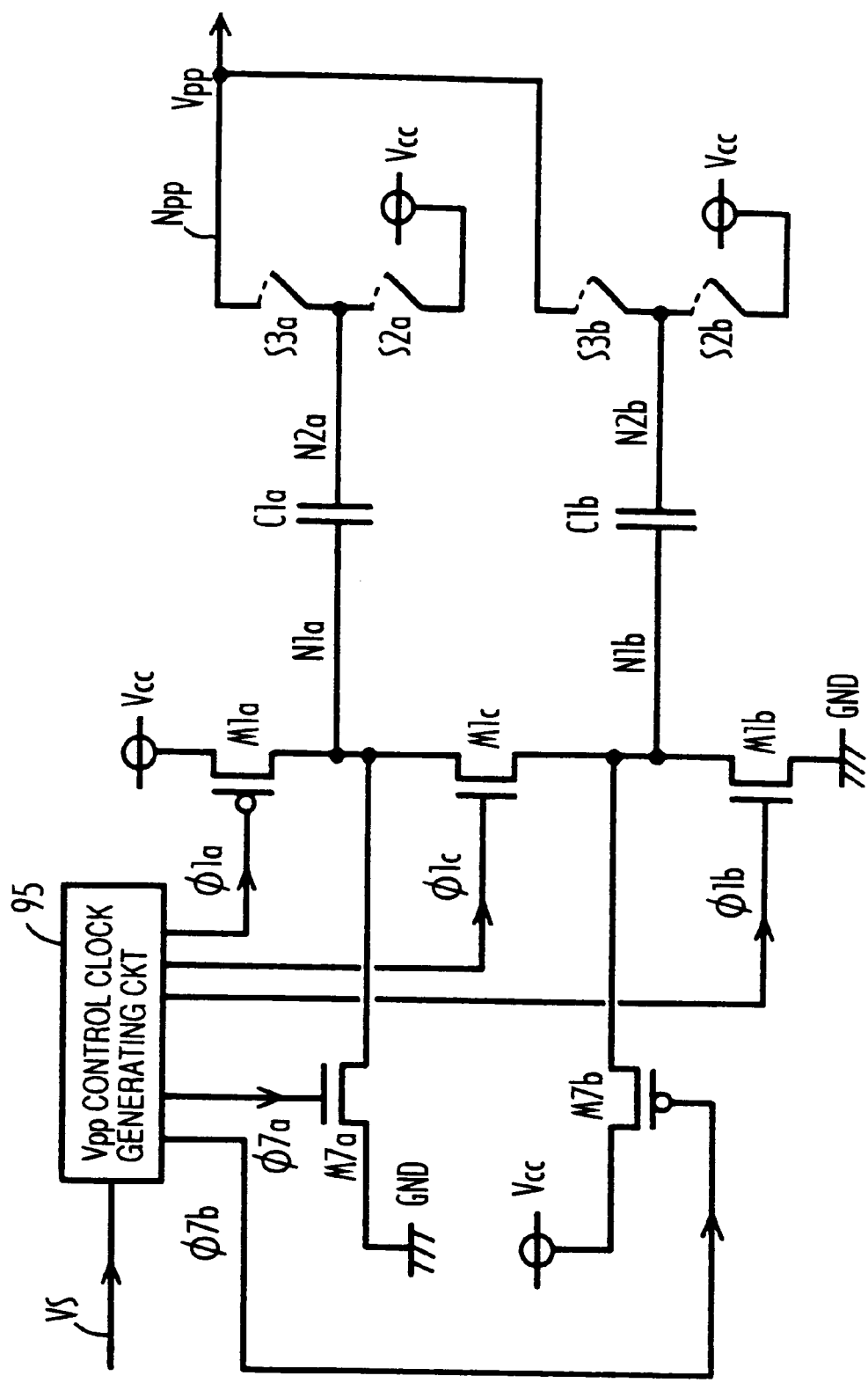
FIG. 23 is a circuit diagram showing details of the boosted potential generating circuit shown in FIG. 22.

FIG. 23 is a circuit diagram showing details of the boosted potential generating circuit 93 shown in FIG. 22. Portions corresponding to those of FIG. 4 are denoted by the same reference characters and description thereof is not repeated.

Referring to FIG. 23, boosted potential generating circuit 93 shown in FIG. 22 includes PMOS transistors M1a, M7b, NMOS transistors M1c, M1b and M7a, capacitors C1a and C1b, switches S3a, S2a, S3b and S2b, and a Vpp control clock generating circuit 95.

NMOS transistor M7a is provided between the node having the ground potential GND and input node N1a. To the gate of NMOS transistor M7a, clock φ7a is input. PMOS transistor M7b is provided between the node having the power supply potential Vcc and input node N1b. To the gate of PMOS transistor M7b, clock φ7b is input. Vpp control clock generating circuit 95 generates clocks φ1a, φ1c, φ1b, φ7a and φ7b, based on the boosted potential generating circuit control signal VS generated from external power supply potential detector 85.

In response to the boosted potential generating circuit control signal VS, when Vpp control clock generating circuit 95 generates the clock φ7a at "L" level and the clock φ7b at the "H" level, NMOS transistor M7a and PMOS transistor N7b both turn off. Therefore, in this case, the boosted potential generating circuit shown in FIG. 23 is equivalent to the boosted potential generating circuit shown in FIG. 4. Therefore, by using clocks φ1a, φ1c and φ1b similar to clocks φ1a, φ1c and φ1b used in FIG. 4, the same operation as the boosted potential generating circuit of FIG. 4 is performed.

When the clock φ1c fixed at the "L" level is generated from Vpp control clock generating circuit 95, NMOS transistor M1c turns off. Consequently, the boosted potential generating circuit shown in FIG. 23 comes to have two charge pump circuits provided parallel to each other. More specifically, one charge pumping circuit is provided by PMOS transistor M1a, NMOS transistor M7a, capacitor C1a and switches S3a and S2a, while another charge pumping circuit is provided by NMOS transistor M1b, PMOS transistor M7b, capacitor C1b and switches S3b and S2b. The charge pumping circuits operate in the similar manner as the charge pumping circuit shown in FIG. 29. Namely, by using clocks φ1a and φ7b which are similar to clock φ1a of FIG. 29 and by using clocks φ7a and φ1b which are similar to clock φ1b of FIG. 29, these two charge pumping circuits operate parallel to each other.

As described above, in the boosted potential generating circuit in accordance with the tenth embodiment, when the target boosted potential Vppd is smaller than the external power supply potential extVcc, the external power supply potential extVcc is directly supplied to the boosted potential node Npp through PMOS transistor 89 to generate the boosted potential Vpp. In this case, the boosted potential generating circuit 93 is stopped. Therefore, when the target boosted potential Vppd is smaller than the external power supply potential extVcc, it is not necessary to operate the boosted potential generating circuit 93, and hence lower power consumption can be realized.

In the boosted potential generating unit in accordance with the tenth embodiment, by controlling the clocks $\phi 1a$, $\phi 1c$, $\phi 1b$, $\phi 7a$ and $\phi 7b$ input to the boosted potential generating circuit 93 included therein, it may be used as the same circuit as the boosted potential generating circuit of FIG. 4, or it may be used as a parallel arrangement of the conventional boosted potential generating circuit shown in FIG. 29. Therefore, if the boosted potential generating circuit 93 is used as the boosted potential generating circuit shown in FIG. 4, lower power consumption is realized. Meanwhile, the maximum value of the boosted potential Vpp which can be generated by the boosted potential generating circuit shown in FIG. 4 is small. Therefore, if the boosted potential Vpp of larger magnitude is desired, the circuit may be used as the parallel arrangement of the conventional boosted potential generating circuits shown in FIG. 29.

(Eleventh Embodiment)

The substrate potential generating circuit as the internal potential generating circuit in accordance with the eleventh embodiment is derived from the following concepts. The conventional substrate potential generating circuit shown in FIG. 31 operates up to |Vbb|<Vcc. In other words, the substrate potential Vbb which can be generated by the conventional boosted potential generating circuit is, in absolute value, close to the power supply potential Vcc. However, if the substrate potential Vbb in its absolute value need not be as large as Vcc, power is wasted. Therefore, we have assumed a potential Vmb which satisfies the following relation.

$$Vmb<Vcc \quad (8)$$

Accordingly, lower power consumption will be realized in a substrate potential generating circuit which operates up to |Vbb|<Vmb.

Figure 24:
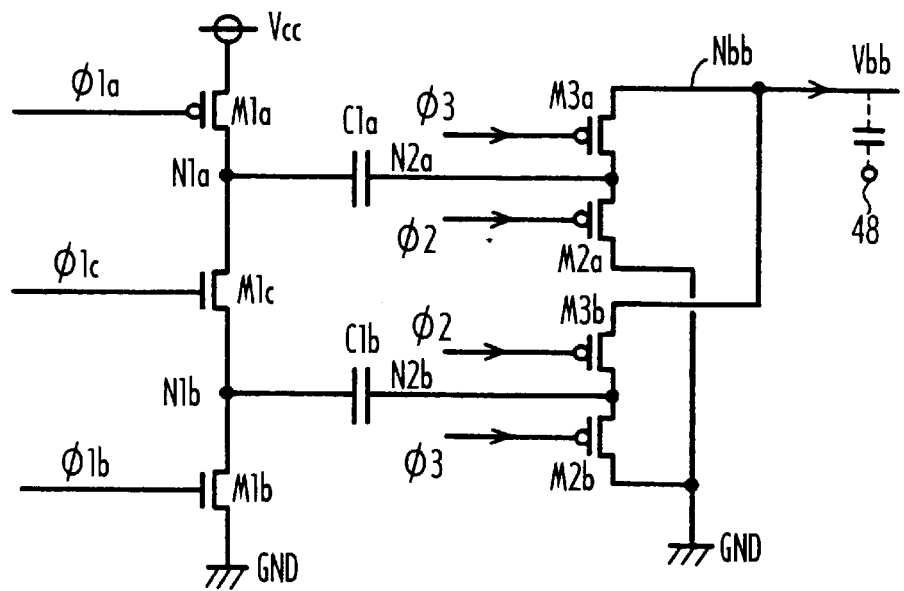
FIG. 24 is a circuit diagram showing details of a substrate potential generating circuit as an internal potential generating circuit in accordance with an eleventh embodiment of the present invention.

FIG. 24 is a circuit diagram showing details of the substrate potential generating circuit as the internal potential generating circuit in accordance with the eleventh embodiment of the present invention.

Referring to FIG. 24, the substrate potential generating circuit in accordance with the eleventh embodiment includes PMOS transistors M1a, M3a, M2a, M3b, and M2b, NMOS transistors M1c and M1b, and capacitors C1a and C1b. PMOS transistor M1a and NMOS transistors M1c and MNb are connected in series between the node having the power supply potential Vcc and the node having the ground potential GND. To the gates of PMOS transistor M1a and NMOS transistors M1c and M1b, clocks $\phi 1a$, $\phi 1c$ and $\phi 1b$ are input, respectively. Capacitor C1a is connected between input node N1a and intermediate node N2a. Capacitor C1b is connected between input node N1b and intermediate node N2b. PMOS transistors M3a and M2a are connected in series between the substrate potential node Nbb and the node having the ground potential GND. PMOS transistors M3b and M2b are connected in series between the substrate potential node Nbb and the node having the ground potential GND. To the gates of PMOS transistors M3a and M2b, clock $\phi 1$ is input, and to the gates of PMOS transistors M2a and M3b, clock $\phi 2$ is input. The substrate potential generating circuit structured in this manner generates the substrate potential Vbb at substrate potential node Nbb. The substrate potential generating circuit may be used as the substrate potential generating circuit 21 of the DRAM shown in FIG. 1.

Figure 25:
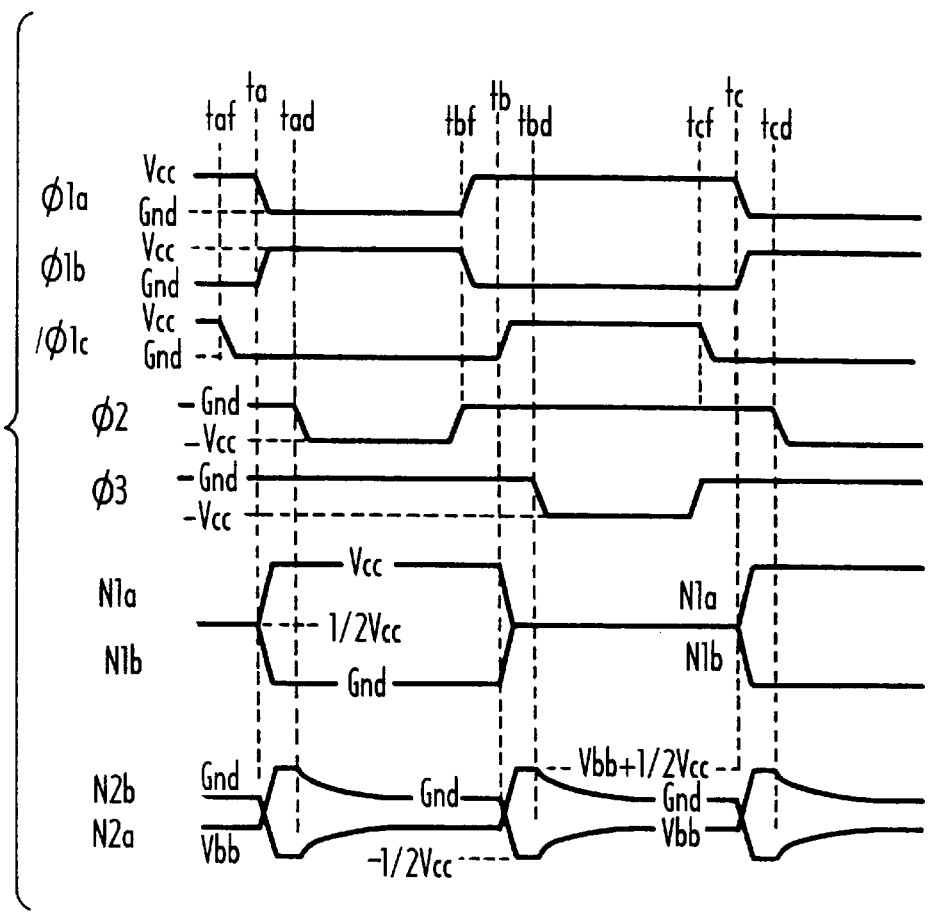
FIG. 25 is a timing chart showing the operation of the substrate potential generating circuit shown in FIG. 24.

FIG. 25 is a timing chart showing the operation of the substrate potential generating circuit shown in FIG. 24. It is assumed that capacitors C1a and C1b each have the capacitance of C, and that the efficiency is 100%.

The amplitude of clocks $\phi 1a$, $\phi 1b$ nd $\phi 1c$ is the power supply potential Vcc. It is assumed that before time taf, the potentials at input nodes N1a and N1b are ½Vcc, the intermediate node N2a is at the substrate potential Vbb and the intermediate node N2b is at the ground potential GND.

At time taf, clock $\phi 1c$ is set to the ground potential GND, whereby NMOS transistor M1c is turned off. At time ta, clock $\phi 1a$ is set to the ground potential GND so that PMOS transistor M1a is turned on, and clock $\phi 1b$ is set to the power supply potential Vcc so that NMOS transistor M1b is turned on. As a result, input node N1a attains to the power supply potential Vcc, and intermediate node N2a is boosted to Vbb+½Vcc, that is, ½Vcc−|Vbb| because of capacitive coupling of capacitor C1a. At the same time, input node N1b attains to the ground potential GND and intermediate node N2b is lowered to −½Vcc by capacitive coupling of input node N1b.

At time tad, clock $\phi 2$ is set to −Vcc, so as to turn PMOS transistors M2a and M3b on. Consequently, intermediate node N2a is discharged from Vbb+½Vcc to the ground potential GND, and intermediate node N2b is charged from ½Vcc to the substrate potential Vbb. This charging is the first supply of negative charges to node Nbb. Further, in this case, charges corresponding to {Vbb+(½) Vcc}·C move from the node having the power supply potential Vcc to the node having the ground potential GND through PMOS transistor M1a, input node N1a, capacitor C1a, intermediate node N2a and PMOS transistor M2a. This is the first charge consumption (power consumption) at the same time, charges corresponding to {Vbb+(½) Vcc}·C move from the electrode 48 (ground potential GND) opposing to the substrate potential node Nbb to the node having the ground potential GND through PMOS transistor M3b, intermediate node N2b, capacitor C1b, input node N1b and NMOS transistor M1b. However, at this time, since the movement of charges is from the node having the ground potential GND to the node having the ground potential GND, no power is consumed.

At time tbf, clock $\phi 1a$ is set to the power supply potential Vcc so that PMOS transistor M1a is turned off, and clock $\phi 1b$ is set to the ground potential GND so that NMOS transistor M1b is turned off. At time tb, clock $\phi 1c$ is set to the power supply potential Vcc so that NMOS transistor M1c is turned on. As a result, the potentials at input nodes N1a and N1b are equalized to ½Vcc. At the same time, intermediate node N2b is boosted to Vbb+½Vcc, that is, ½Vcc−|Vbb| by the capacitive coupling of input node N1b, and intermediate node N2a is lowered to −½Vcc by the capacitive coupling of input node N1a.

At time tbd, clock $\phi 3$ is set to −Vcc so that PMOS transistors M3a and M2b are turned on. Consequently, intermediate node N2b is discharged from Vbb+(½) Vcc to the ground potential GND, and intermediate node N2a is charged from −Vcc to the substrate potential Vbb. This charging is the second supply of negative charges to node Nbb. In this case, charges corresponding to {Vbb+(½) Vcc}·C move from the electrode 48 (ground potential GND) opposing to the substrate potential node Nbb to the node having the ground potential GND through PMOS transistor M3*a*, intermediate node N2*a*, capacitor C1*a*, input node N1*a*, NMOS transistor M1*c*, input node N1*b*, capacitor C1*b*, intermediate node N2*b* and PMOS transistor M2*b*. The movement of charges is from the node having the ground potential GND to the node having the ground potential GND. Therefore, power is not consumed. At time tcf, the operation of the next cycle starts.

Namely, one cycle of operation is completed from taf to tcf.

The total amount of charges consumed in one cycle from the power supply potential Vcc to the ground potential GND is {(½) Vcc+Vbb}·C. Here, the substrate potential Vbb is of a negative value. Meanwhile, the amount of charges supplied to the substrate potential node Nbb in one cycle is −(Vcc+2Vbb)·C. Therefore charge efficiency is 200%, which exceeds the charge efficiency of the conventional substrate potential generating circuit shown in FIG. 31, which was 100%.

Figure 31:
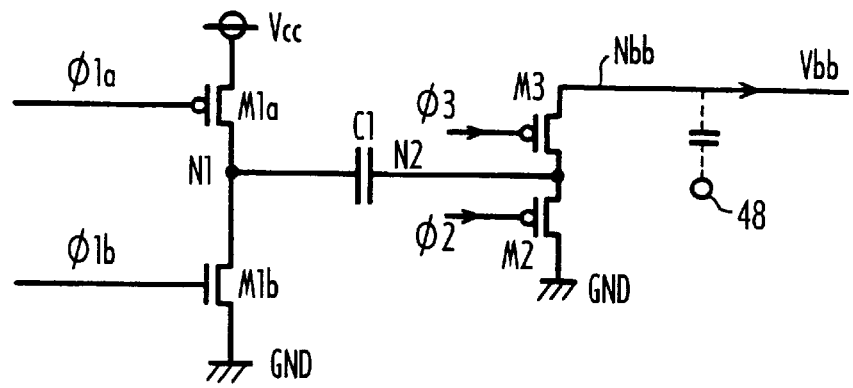
FIG. 31 is a circuit diagram showing details of a substrate potential generating circuit as a conventional internal potential generating circuit.
Figure 32:
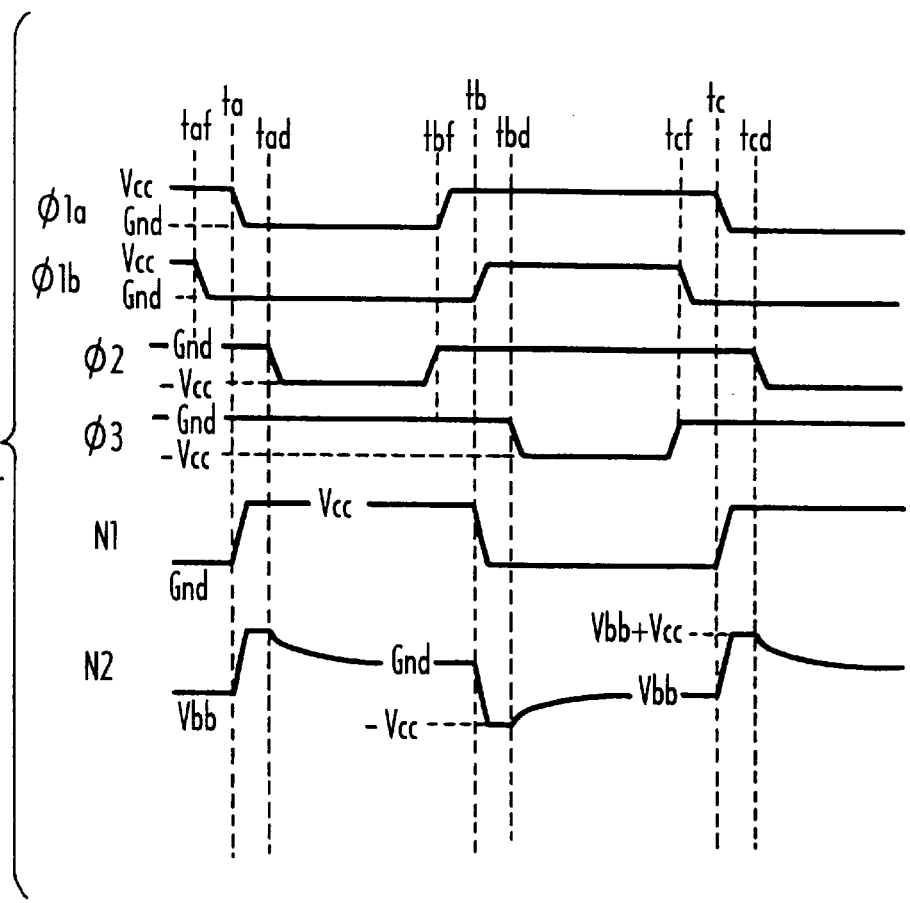
FIG. 32 is a timing chart showing the operation of the substrate potential generating circuit shown in FIG. 31.

Therefore, the substrate potential generating circuit in accordance with the present invention realizes lower power consumption than the prior art. Further, in the present embodiment, the maximum value of the possible substrate potential Vbb is, in absolute value, (½) Vcc, while it is Vcc in the prior art (FIG. 31). It can be understood that lower power consumption is realized from this point of view. The substrate potential generating circuit described above corresponds to the boosted potential generating circuit shown in FIG. 4. The substrate potential generating circuit may be provided corresponding to the boosted potential generating circuits in accordance with the second to eighth embodiments.

(Twelfth Embodiment)

Figure 26:
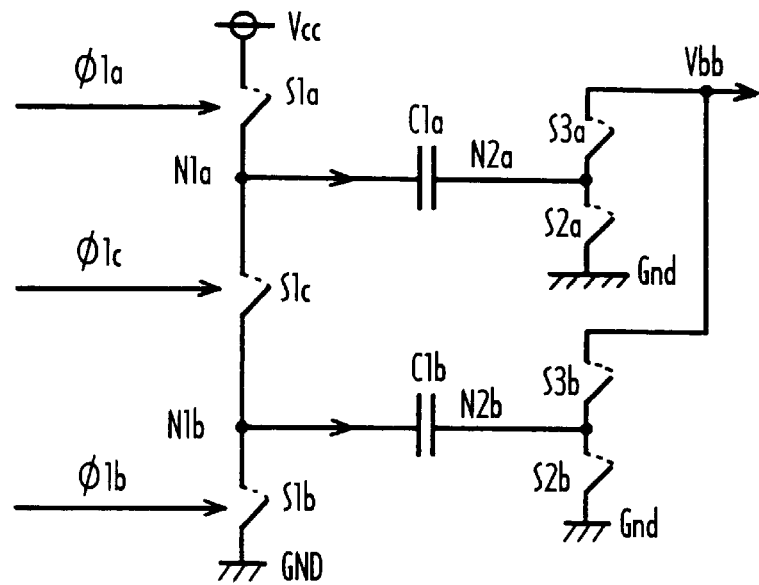
FIG. 26 is a circuit diagram showing details of a substrate potential generating circuit as an internal potential generating circuit in accordance with a twelfth embodiment of the present invention.

FIG. 26 is a circuit diagram showing details of the substrate potential generating circuit as the internal potential generating circuit in accordance with the twelfth embodiment. Portions corresponding to those of FIG. 24 are denoted by the same reference characters and description thereof is not repeated.

In the substrate potential generating circuit shown in FIG. 26, PMOS transistor M1*a* is replaced by switch S1*a*, NMOS transistor M1*c* of FIG. 24 is replaced by switch S1*c*, NMOS transistor M1*b* of FIG. 24 is replaced by switch S1*b*, PMOS transistor M3*a* of FIG. 24 is replaced by switch S3*a*, PMOS transistor M2*a* of FIG. 24 is replaced by switch S2*a*, PMOS transistor M3*b* of FIG. 24 is replaced by switch S3*b*, and PMOS transistor M2*b* of FIG. 24 is replaced by switch S2*b*.

Switch S1*a* receives clock φ1*a* which is similar to clock φ1*a* of FIG. 24 and operates in the same manner as PMOS transistor M1*a*. Switch S1*c* receives clock φ1*c* which is similar to clock φ1*c* of FIG. 24 and operates in the same manner as NMOS transistor M1*c* of FIG. 24. Switch φ1*b* receives clock φ1*b* which is similar to clock φ1*b* of FIG. 24 and operates in the same manner as NMOS transistor M1*b* of FIG. 24. Switches S3*a*, S2*a*, S3*b* and S2*b* operate in the similar manner as PMOS transistors M3*a*, M2*a*, M3*b* and M2*b* of FIG. 24, respectively.

Therefore, the boosted potential generating circuit in accordance with the twelfth embodiment provide the similar effects as the boosted potential generating circuit in accordance with the eleventh embodiment.

(Thirteenth Embodiment)

The structure of the internal potential generating circuit in accordance with the thirteenth embodiment is the same as the circuit structure of any of the boosted potential generating circuits in accordance with the first to eighth and tenth embodiments and any of the substrate potential generating circuits in accordance with the eleventh and twelfth embodiments. The internal potential generating circuit in accordance with the thirteenth embodiment is characterized by a capacitor therein.

Figure 27:
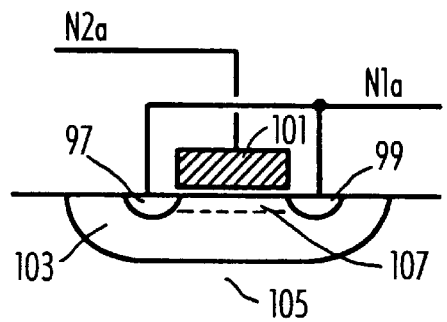
FIG. 27 is a cross sectional view showing a capacitor used in an internal potential generating circuit in accordance with a thirteenth embodiment of the present invention.

FIG. 27 shows a structure of a capacitor used in the internal potential generating circuit in accordance with the thirteenth embodiment. FIG. 27 shows an example when it is used as capacitor C1*a* of FIG. 4.

Referring to FIG. 27, the capacitor used for the internal potential generating circuit in accordance with the thirteenth embodiment is formed in the following manner. A P well 103 is formed in a P type substrate 105. $N^+$ diffusion regions 97 and 99 are formed in P well 103. A gate 101 is formed on channel 107 with an insulating film, not shown, interposed. $N^+$ diffusion regions 97 and 99 are connected to node N1*a* of FIG. 4. Gate 101 is connected to node N2*a* of FIG. 4. The capacitor formed in this manner functions as a MOS capacitor. The capacitor shown in FIG. 27 may be used as capacitors C1*a*, C1*b*, C1*d*, C1*e*, C2*a*, C2*b*, C3*a*, and C3*b* of FIGS. 4, 8, 10, 12, 13, 15, 18, 20, 23, 24, and 26.

FIG. 28 shows another structure of a capacitor used in the internal potential generating circuit in accordance with the thirteenth embodiment. FIG. 28 shows an example of capacitor C1*a* of FIG. 4.

Referring to FIG. 28, this another capacitor used in the internal potential generating circuit in accordance with the thirteenth embodiment is formed in the following manner. An N well 109 is formed in a P type substrate 105. $N^+$ diffusion regions 97 and 99 are formed in N well 109. A gate 101 is formed with an insulating film, not shown, interposed. $N^+$ diffusion regions 97 and 99 are connected to intermediate node N2*a* of FIG. 4. Gate 101 is connected to input node N1*a* of FIG. 4. Such a capacitor functions as a capacitor in an accumulation mode. The capacitor of FIG. 28 may be used as capacitors C1*a*, C1*b*, C1*d*, C1*e*, C2*a*, C2*b*, C3*a* and C3*b* of FIGS. 4, 8, 10, 12, 13, 15, 18, 20, 23, 24 and 26.

Though not shown, a poly-poly capacitor may be applied.

Although the present invention has been described and illustrated in detail, it is clearly understood that the same is by way of illustration and example only and is not to be taken by way of limitation, the spirit and scope of the present invention being limited only by the terms of the appended.

What is claimed is:

1. An internal potential generating circuit for generating an internal potential at an internal potential node, comprising:

first charge pumping means for generating said internal potential by injecting charges to said internal potential node; and second charge pumping means for generating said internal potential by injecting charges to said internal potential node; wherein said first charge pumping means includes a first input node to which a first power supply potential is applied, a first intermediate node having its potential changed in response to a change in potential at said first input node, first capacitor means connected between said first input node and said first intermediate node, first injecting means for injecting charges from said first intermediate node to said internal potential node, and first supply means for supplying said first power supply potential to said first intermediate node;

said second charge pumping means includes a second input node to which a second power supply potential is applied, a second intermediate node having its potential changed in response to a change in potential of said second input node, second capacitor means connected between said second input node and said second intermediate node, second injecting means for injecting charges from said second intermediate node to said internal potential node, and second supply means for supplying said first power supply potential to said second intermediate node;

said internal potential generating circuit further comprising first equalizing means for equalizing potentials of said first and second input nodes; wherein said first and second injecting means inject charges alternately to said internal potential node, after injection of charges from said first injecting means and supply of said first power supply potential from said second supply means, equalization by said first equalizing means starts, thereafter, supply of said first power supply potential by said first supply means and injection of charges by said second injecting means are performed, and thereafter, injection of charges by said first injecting means and supply of said first power supply potential by said second supply means are started.

2. The internal potential generating circuit according to claim 1, further comprising second equalizing means for equalizing potentials of said first and second intermediate nodes; wherein after injection of charges by said second injecting means and supply of said first power supply potential by said first supply means are started, equalization by said second equalizing means starts, equalization by said first equalizing means continues after start of equalization by said second equalizing means, after equalization by said first and second equalizing means is completed, injection of charges by said first injecting means and supply of said first power supply potential by said second supply means are started.

3. The internal potential generating circuit according to claim 1, further comprising second equalizing means for equalizing potentials of said first and second intermediate nodes; wherein equalization by said second equalizing means is performed after the start of injection of charges by said second injecting means and supply of said first power supply potential by said first supply means and after equalization by said first equalizing means, and thereafter, injection of charges by said first injecting means and supply of said first power supply potential by said second supply means are started.

4. The internal potential generating circuit according to claim 1, wherein said first injecting means includes a first transistor, on/off of said first transistor being controlled by a first pulse signal having an amplitude larger than an absolute value of a potential difference between said first power supply potential and said second power supply potential; and said second injecting means includes a second transistor, on/off of said second transistor being controlled by a second pulse signal having an amplitude larger than an absolute value of a potential difference between said first power supply potential and said second power supply potential.

5. The internal potential generating circuit according to claim 1, wherein said first injecting means includes a diode having its cathode connected to said internal potential node and its anode connected to said first intermediate node;

said first supply means includes a diode having its cathode connected to said first intermediate node and its anode connected to a node having said first power supply potential;

said second injecting means includes a diode having its cathode connected to said internal potential node and its anode connected to said second intermediate node; and said second supply means includes a diode having its cathode connected to said second intermediate node and its anode connected to a node having said first power supply potential.

6. The internal potential generating circuit according to claim 1, wherein said first charge pumping means further includes first connecting means for controlling connection between a node having said first power supply potential and said first input node, and second connecting means for controlling connection between said first input node and a node having said second power supply potential;

said second charge pumping means further includes third connecting means for controlling connection between a node having said second power supply potential and said second input node, and fourth connecting means for controlling connection between said second input node and a node having said first power supply potential;

when said first and second charge pumping means are to be operated integrally, connection between said first input node and the node having said second power supply potential is disconnected by said second connecting means and connection between said second input node and the node having said first power supply potential is disconnected by said fourth connecting means; and when said first and second charge pumping means are to be operated separately, said first input node is separated from said second input node by said first equalizing means.

7. A boosted potential generating unit for generating a boosted potential at a boosted potential node, comprising;

detecting means for detecting whether the level of an external power supply potential is higher than a target boosted potential level;

boosted potential generating means for generating said boosted potential by boosting said external power supply potential; and connecting and supplying means provided between said boosted potential node and a node having said external power supply potential for connecting said boosted potential node with the node having the external power supply potential in response to the detection result of said detecting means; wherein when the level of said external power supply potential is higher than the level of said boosted potential to be generated, said external power supply potential is supplied to said boosted potential node as said boosted potential through said connecting and supplying means, and at this time, operation of said boosted potential generating means is stopped; and when the level of said external power supply potential is not higher than the level of said boosted potential to be generated, said boosted potential is generated at said boosted potential node by said boosted potential generating means and, at this time, connection between said boosted potential node and the node having said external power supply potential is disconnected by said connecting and supplying means.

8. The boosted potential generating unit according to claim 7, wherein said boosted potential generating means includes first charge pumping means for generating said boosted potential by injecting charges to said boosted potential node, and second charge pumping means for generating said boosted potential by injecting charges to said boosted potential node;

said first charge pumping means includes a first input node to which said external power supply potential is applied a first intermediate node having its potential changed in response to a change in potential of said first input node, first capacitor means connected between said first input node and said first intermediate node, first injecting means for injecting charges from said first intermediate node to said boosted potential node, and first supplying means for supplying said external power supply potential to said first intermediate node;

said second charge pumping means includes a second input node to which a ground potential is applied, a second intermediate node having its potential changed in response to a change in potential of said second input node, second capacitor means connected between said second input node and said second intermediate node, second injecting means for injecting charges from said second intermediate node to said boosted potential node, and second supplying means for supplying said external power supply potential to said second intermediate node;

said boosted potential generating means further includes equalizing means for equalizing potentials of said first and second input nodes;

equalization by said equalizing means is started after injection of charges from said first injecting means and supply of said external power supply potential by said second supplying means, thereafter, supply of said external power supply potential by said first supplying means and injection of charges by said second injecting means are performed, and thereafter, injection of charges by said first injecting means and supply of said external power supply potential by said second supplying means are started.

9. The boosted potential generating unit according to claim 8, wherein said first charge pumping means further includes first connecting means for controlling connection between a node having said external power supply potential and said first input node, and second connecting means for controlling connection between said first input node and a node having said ground potential;

said second charge pumping means further includes third connecting means for controlling connection between a node having said ground potential and said second input node and a fourth connecting means for controlling connection between said second input node and a node having said external power supply potential;

when said first and second charge pumping means are to be operated integrally, connection between said first input node and the node having said ground potential is disconnected by said second connecting means and connection between said second input node and the node having said external power supply potential is disconnected by said fourth connecting means; and when said first and second charge pumping means are to be operated separately, said first input node is separated from said second input node by said equalizing means.

10. An internal potential generator comprising:

a first P type transistor coupled between a power supply and a first node, and having a gate receiving one of complementary signals;

a first N type transistor coupled between ground and a second node, and having a gate receiving the other of said complementary signals;

an equalize transistor coupled between said first node and said second node, and rendered conductive when said first P type and first N type transistors are non-conductive;

a first capacitor coupled between said first node and a third node;

a second capacitor coupled between said second node and a fourth node;

a first precharge transistor coupled between said third node and a fifth node supplied with a prescribed potential;

a second precharge transistor coupled between said fourth node and a sixth node supplied with the prescribed potential;

a first output transistor coupled between said third node and an internal potential node; and a second output transistor coupled between said fourth node and said internal potential node.

11. The internal potential generator according to claim 10, wherein said first precharge transistor is an N type transistor;
said second precharge transistor is an N type transistor;
said first output transistor is an N type transistor;
said second output transistor is an N type transistor;
said prescribed potential is a power supply potential; and
a potential generated to said internal potential node is higher than said power supply potential.

12. The internal potential generator according to claim 11, wherein said first precharge transistor is rendered non-conductive when said first P type transistor is rendered conductive;

said second precharge transistor is rendered nonconductive when said equalize transistor is rendered conductive;

said first output transistor is rendered conductive when said first P type transistor is rendered conductive; and said second output transistor is rendered conductive when said equalize transistor is rendered conductive.

13. The internal potential generator according to claim 11, further comprising:

a third capacitor coupled to a gate of said first precharge transistor;

a fourth capacitor coupled to a gate of said second precharge transistor;

a fifth capacitor coupled to a gate of said first output transistor;

a sixth capacitor coupled to a gate of said second output transistor;

a first clamp transistor coupled between the power supply and the gate of said first precharge transistor, and having a gate coupled to the power supply;

a second clamp transistor coupled between the power supply and the gate of said second precharge transistor, and having a gate coupled to the power supply;

a third clamp transistor coupled between the power supply and the gate of said first output transistor, and having a gate coupled to the power supply; and a fourth clamp transistor coupled between the power supply and the gate of said second output transistor, and having a agate coupled to the power supply.

14. The internal potential generator according to claim 13, further comprising:

a first level converting circuit receiving a first clock having a first amplitude and applying a first converted clock having a second amplitude larger than said first amplitude to said fifth capacitor; and a second level converting circuit receiving a second clock having the first amplitude and applying a second converted clock having the second amplitude to said sixth capacitor.

15. The internal potential generator according to claim 14, wherein said first amplitude is the power supply potential, and said second amplitude is the potential of said internal potential node.

16. The internal potential generator according to claim 10, further comprising:

another equalize transistor coupled between said third node and said fourth node.

17. The internal potential generator according to claim 10, further comprising:

a second N type transistor coupled between a seventh node and ground, and rendered conductive when said first P type and first N type transistors are non-conductive;

a third capacitor coupled between said seventh node and an eighth node;

a third precharge transistor coupled between said eighth node and a ninth node supplied with the prescribed potential; and a third output transistor coupled between said eighth node and said internal potential node, wherein said first N type transistor coupled to ground through said seventh node and said second N type transistor.

18. The internal potential generator according to claim 17, further comprising:

a third N type transistor coupled between a tenth node and ground, and having a gate receiving said other of the complementary signals;

a fourth capacitor coupled between said tenth node and an eleventh node;

a fourth precharge transistor coupled between said eleventh node and a twelfth node supplied with the prescribed potential; and a fourth output transistor coupled between said eleventh node and said internal potential node, wherein said second N type transistor coupled to ground through said tenth node and said third N type transistor.

19. The internal potential generator according to claim 10, further comprising:

a second N type transistor coupled between said first node and ground; and a second P type transistor coupled between said second node and the power supply.

20. The internal potential generator according to claim 19, wherein said equalize transistor is rendered non-conductive and gates of said second N type and said second P type transistors receive clock signals respectively in response to a control signal.

21. The internal potential generator according to claim 10, wherein said first precharge transistor is a P type transistor;

said second precharge transistor is a P type transistor;

said first output transistor is a P type transistor;

said second output transistor is a P type transistor;

said prescribed potential is a ground potential; and a potential generated to said internal potential node is lower than said ground potential.

22. An internal potential generator comprising:

a P type transistor coupled to an externally applied power supply and an internal potential node, for applying an externally applied power supply potential to said internal potential node, and rendered non-conductive when said externally applied power supply potential is lower than a target boosted potential level; and a boosted potential generating unit performing a boost operation to generate a boosted potential higher than said power supply potential to said internal potential node when said externally applied power supply potential is lower than the target boosted potential level, and stopping the boost operation when said externally applied power supply potential is higher than the target boosted potential level.

* * * * *

UNITED STATES PATENT AND TRADEMARK OFFICE
CERTIFICATE OF CORRECTION

PATENT NO. : 5,936,459
DATED : August 10, 1999
INVENTOR(S) : Takeshi Hamamoto

It is certified that error appears in the above-identified patent and that said Letters Patent is hereby corrected as shown below:

Column 30, line 43, change "N7b" to --M7b--;

Claim 13, line 22, change "agate" to --gate--.

Signed and Sealed this

Third Day of April, 2001

Attest:

NICHOLAS P. GODICI

Attesting Officer    Acting Director of the United States Patent and Trademark Office